US008110265B2

(12) United States Patent
Kriegel et al.

(10) Patent No.: US 8,110,265 B2
(45) Date of Patent: Feb. 7, 2012

(54) PET CONTAINER AND COMPOSITIONS HAVING ENHANCED MECHANICAL PROPERTIES AND GAS BARRIER PROPERTIES

(75) Inventors: Robert Kriegel, Decatur, GA (US);
Xiaoyan Huang, Marietta, GA (US);
Robert Schiavone, Matthews, NC (US);
T. Edwin Freeman, Woodstock, GA (US); Mihaela Penescu, Decatur, GA (US)

(73) Assignee: The Coca-Cola Company, Atlanta, GA (US)

( * ) Notice: Subject to any disclaimer, the term of this patent is extended or adjusted under 35 U.S.C. 154(b) by 246 days.

(21) Appl. No.: 12/629,657

(22) Filed: Dec. 2, 2009

(65) Prior Publication Data

US 2010/0143547 A1 Jun. 10, 2010

Related U.S. Application Data

(60) Provisional application No. 61/121,034, filed on Dec. 9, 2008.

(51) Int. Cl.
*B29D 22/00* (2006.01)
*B29D 23/00* (2006.01)
*B32B 1/08* (2006.01)

(52) U.S. Cl. ............... 428/36.6; 428/35.7; 428/36.9; 428/36.92

(58) Field of Classification Search .......... 428/35.7, 428/36.6, 36.9, 36.92
See application file for complete search history.

(56) References Cited

U.S. PATENT DOCUMENTS

| 4,161,579 | A | 7/1979 | Berardinelli et al. |
| 4,223,128 | A | 9/1980 | Halek et al. |
| 4,609,721 | A | 9/1986 | Kirshenbaum et al. |
| 5,473,161 | A | 12/1995 | Nix et al. |
| 5,888,598 | A | 3/1999 | Brewster et al. |
| 5,902,864 | A | 5/1999 | Al Ghatta |
| 5,939,516 | A | 8/1999 | Greaves et al. |
| 6,077,891 | A | 6/2000 | Herbst et al. |
| 6,150,454 | A | 11/2000 | Wu et al. |
| 6,350,822 | B1 | 2/2002 | Van Diepen et al. |
| 6,365,247 | B1 | 4/2002 | Cahill et al. |
| 6,441,104 | B1 | 8/2002 | Ishida |
| 6,489,386 | B1 | 12/2002 | Plotzker et al. |
| 6,500,890 | B2 | 12/2002 | Edwards et al. |
| 6,558,762 | B2 | 5/2003 | Cahill et al. |
| 7,081,511 | B2 | 7/2006 | Wu et al. |
| 7,094,863 | B2 | 8/2006 | Moore et al. |

(Continued)

FOREIGN PATENT DOCUMENTS

EP 666285 8/1995

(Continued)

OTHER PUBLICATIONS

Dubey, et al. *Ind. J. Heterocycl. Chem.* 2005, 14, 301-306.

(Continued)

*Primary Examiner* — Michael C Miggins
(74) *Attorney, Agent, or Firm* — Sutherland Asbill & Brennan LLP

(57) ABSTRACT

A container comprising a polyester composition with enhanced mechanical properties is provided. The polyester composition comprises a polyester and a creep control agent. In particular embodiments, the polyester composition comprises a polyester, a creep control agent, and a gas barrier additive. In particular embodiments, the creep control agents are molecules or polymers comprising dianhydrides, bis-lactams, bis-oxazoles, and epoxides.

21 Claims, 3 Drawing Sheets

U.S. PATENT DOCUMENTS

| | | |
|---|---|---|
| 7,144,632 B2 | 12/2006 | Hayes |
| 7,144,972 B2 | 12/2006 | Hayes |
| 7,193,029 B2 | 3/2007 | Hayes |
| 2002/0004578 A1 | 1/2002 | Shelby et al. |
| 2003/0228479 A1 | 12/2003 | Shelby et al. |
| 2004/0116619 A1 | 6/2004 | Moad et al. |
| 2005/0171250 A1 | 8/2005 | Hayes |
| 2005/0221036 A1 | 10/2005 | Shi |
| 2006/0009609 A1 | 1/2006 | Hayes |
| 2006/0199919 A1 | 9/2006 | Hale et al. |
| 2006/0275568 A1* | 12/2006 | Shi et al. .................. 428/35.7 |
| 2006/0287496 A1 | 12/2006 | Crawford et al. |
| 2006/0293416 A1 | 12/2006 | Peeters et al. |
| 2007/0082156 A1 | 4/2007 | Shi et al. |
| 2008/0071009 A1 | 3/2008 | Simon |
| 2008/0093777 A1 | 4/2008 | Sequeira et al. |
| 2008/0177010 A1 | 7/2008 | Cavaglia |
| 2008/0274316 A1 | 11/2008 | Griffith et al. |
| 2009/0017320 A1 | 1/2009 | Donelson et al. |
| 2009/0198022 A1 | 8/2009 | Nichols et al. |

FOREIGN PATENT DOCUMENTS

| | | |
|---|---|---|
| EP | 1470175 | 10/2004 |
| WO | WO 96/40821 | 5/1996 |
| WO | WO 01/92007 | 12/2001 |
| WO | WO 2007/106302 | 9/2007 |

OTHER PUBLICATIONS

SciFinder Structural Search for bis(2-(benzoyloxy)ethyl) terephthalate, Jan. 2008.

Disclosure Under 37 C.F.R. 1,56 for U.S. Appl. No. 12/629,657 (Submitted Herewith).

* cited by examiner

PET CONTAINER AND COMPOSITIONS HAVING ENHANCED MECHANICAL PROPERTIES AND GAS BARRIER PROPERTIES

CROSS-REFERENCE TO RELATED APPLICATIONS

This application claims benefit of U.S. Provisional Application No. 61/121,034, filed Dec. 9, 2008. This application is incorporated herein by reference in its entirety.

FIELD OF THE INVENTION

The present invention relates to polyester products such as poly(ethylene terephthalate) containers. More particularly, this invention relates to polyester containers for use in applications wherein enhanced mechanical properties are desirable.

BACKGROUND

Polyethylene terephthalate and its copolyesters (hereinafter referred to collectively as "PET") are widely used to make containers for carbonated soft drinks, juice, water, and the like due to their excellent combination of clarity, mechanical, and gas barrier properties. In spite of these desirable characteristics, oxygen and carbon dioxide gas barrier properties of PET limit application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2 percent per week loss rate at room temperature depending on the size of the container. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. After a PET bottle is filled with approximately four volumes of carbon dioxide, the PET bottle will slowly expand with time due to the creep of PET molecules under pressure. The carbonation level is reduced due to the bottle expansion. The permeability of PET to carbon dioxide and the degree of bottle expansion due to PET molecule creep therefore determines the shelf life of the packaged carbonated beverage and thus, the suitability of PET as a packaging material.

Numerous technologies have been developed or are being developed to enhance the barrier of PET to small gas molecules, but some are too expensive and others may cause undesirable changes in PET mechanical properties, stretch ratio, and/or clarity. Very little work has been done to improve PET bottle carbonation shelf life by controlling PET bottle creep.

Thus, there is a need in the art to enhance the barrier performance of PET and control PET bottle creep for use in applications that will require enhanced barrier, such as in the packaging of carbonated beverages and oxygen sensitive beverages and foods, in a manner that does not cause substantial degradation of the PET mechanical properties, does not substantially impact the stretch ratio of the PET, and/or does not negatively impact the clarity of the PET.

SUMMARY

This invention addresses the above-described needs by providing a polyester container with enhanced mechanical properties comprising a polyester composition comprised of polyester and a creep control agent. According to another embodiment, a polyester composition is provided comprising a polyester, a creep control agent and optionally a gas barrier additive.

In one aspect of this disclosure, the polyester composition comprises a creep control agent having the chemical structure of Formula I:

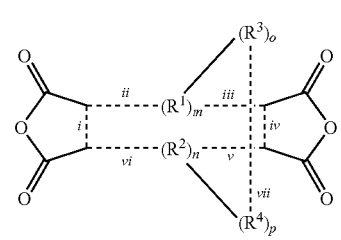

I wherein $R^1$, $R^2$, $R^3$, and $R^4$, independent of one another, may comprise a heteroatom, a tetravalent carbon atom, or a $C_1$-$C_3$ divalent or trivalent hydrocarbon;

wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, and vi, independent of one another, comprise a single or double bond; wherein when i is a double bond, ii and vi are single bonds; wherein when ii is a double bond, i and iii are single bonds; wherein when iii is a double bond, ii and iv are single bonds; wherein when iv is a double bond iii and v are single bonds; wherein when v is a double bond, iv and vi are single bonds; wherein when vi is a double bond, i and v are single bonds; wherein vii may be a single bond, double bond, or no bond at all connecting $R^3$ and $R^4$;

wherein m, n, o, and p, independent of one another, may be 0 or 1; wherein when m is 0, bonds ii and iii fowl a single continuous bond; wherein when n is 0, bonds vi and v form a single continuous bond; wherein when o is 0, $R^4$ is bonded to $R^1$ by a single bond; and wherein when p is 0, $R^3$ is bonded to $R^2$ by a single bond.

In another aspect, the polyester composition comprises a creep control agent having the chemical structure of Formula II:

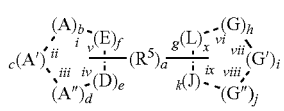

II wherein A, A', A", E, D, G, G', G", L, and J, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, vi, vii, viii, ix, and x, independent of one another, may comprise a single or double bond; wherein when i is a double bond, ii and v are single bonds; wherein when ii is a double bond, i and iii are single bonds; wherein when iii is a double bond, ii and iv are single bonds; wherein when iv is a double bond, iii and v are single bonds; wherein when v is a double bond, i and iv are single bonds; wherein when vi is a double bond, vii and x are single bonds; wherein when vii is a double bond, vi and viii are single bonds; wherein when viii is a double bond, vii and ix are single bonds; wherein when ix is a double bond, viii and x are single bonds; wherein when x is a double bond, vi and ix are single bonds;

wherein b, c, d, e, f, g, h, i, j, and k, independent of one another may be 0 or 1;

wherein a may be 0 or 1; and wherein $R^5$ may be a heteroatom or a $C_1$-$C_{10}$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In another aspect, the polyester composition comprises a creep control agent having the chemical structure of Formula III:

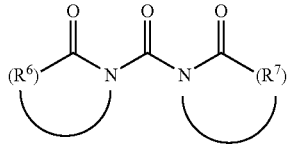

III wherein $R^6$ and $R^7$, independent of one another, may comprise a $C_1$-$C_5$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In yet another aspect, the polyester composition comprises a creep control agent having the chemical structure of Formula IV:

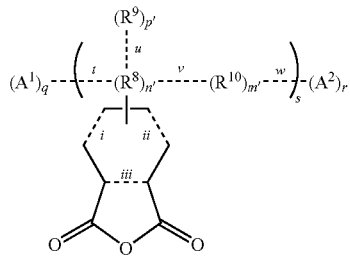

IV wherein $A^1$, $A^2$, $R^8$, $R^9$, and $R^{10}$, independent of one another, may comprise a heteroatom, a tetravalent carbon atom, a $C_1$-$C_{10}$ divalent or trivalent hydrocarbon, or a $C_1$-$C_{10}$ hydrocarbyl that may be unsubstituted or substituted with one or more functional moieties; wherein each heteroatom, tetravalent carbon atom, or $C_1$-$C_{10}$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein m', n', and p', independent of one another, may be 0 or 1;

wherein i, ii, and iii, independent of one another may be a single bond or a double bond;

wherein t, u, v, and w, independent of one another may be a single bond, double bond, or triple bond; and wherein q, r, and s may be from 0 to 10,000.

In another aspect of this disclosure, the polyester composition desirably comprises a creep control agent having the chemical structure of Formula V:

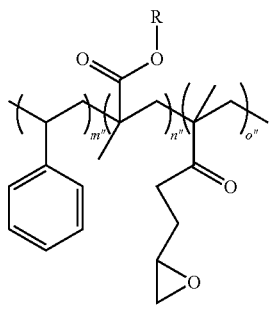

V wherein R may comprise a heteroatom or a $C_1$-$C_{10}$ hydrocarbyl which may be unsubstituted or substituted with one or more functional moieties; and wherein m'', n'', and o'', independent of one another, may be from 0 to 1,000.

In yet another aspect, the polyester composition comprises a creep control agent having the chemical structure of Formula VI:

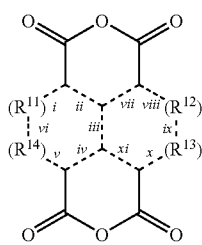

VI wherein $R^{11}$, $R^{12}$, $R^{13}$, and $R^{14}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, and xi, independent of one another, are a single bond or double bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, and xi are single bonds; wherein when v is a double bond, vi and iv are single bonds; wherein when vi is a double bond, i and v are single bonds; wherein when vii is a double bond, ii, iii, and viii are single bonds; wherein when viii is a double bond, vi and ix are single bonds; wherein when ix is a double bond, viii and x are single bonds; wherein when x is a double bond, ix and xi are single bonds; wherein when xi is a double bond, iv, x, and iii are single bonds.

In yet another aspect, the polyester composition comprises a creep control agent having the chemical structure of Formula VII:

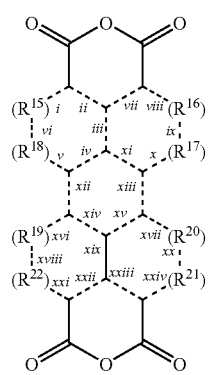

VII wherein $R^{15}$, $R^{16}$, $R^{17}$, $R^{18}$, $R^{19}$, $R^{20}$, $R^{21}$, and $R^{22}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, xi, xii, xiii, xiv, xv, xvi, xvii, xviii, xix, xx, xxi, xxii, independent of one another, are a double bond or single bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, xi, and xii are single bonds; wherein when v is a double bond, vi, iv, and xii are single bonds; wherein when vi is a double bond, i and v are single bonds; wherein when vii is a double bond, ii, iii and viii are single bonds; wherein when viii is a double bond, vii and ix are single bonds; wherein when ix is a double bond, viii and x are single bonds; wherein when x is a double bond, ix, xi, and xiii are single bonds; wherein when xi is a double bond, iii, iv, xiii and x are single bonds; wherein when xii is a double bond, v, iv, xvi, and xiv are single bonds; wherein when xiv is a double bond, xii, xvi, xv, and xix are single bonds; wherein when xv is a double bond, xiii, xvii, xiv, and xix are single bonds; when xiii is a double bond, xi, x, xv, and xvii are single bonds; when xvi is a double bond, xii, xiv, and xviii are single bonds; wherein when xviii is a double bond, xvi and xxi are single bonds; wherein when xxi is a double bond, xviii and xxii are single bonds; wherein when xxii is a double bond, xxi, xix, and xxiii are single bonds; wherein when xix is a double bond, xiv, xv, xxii, and xxiii are single bonds; wherein when xxiii is a double bond, xix, xxii, and xxiv are single bonds; wherein when xxiv is a double bond, xxiii and xx are single bonds; wherein when xx is a double bond, xvii and xxiv are single bonds; and wherein when xvii is a double bond, xv, xiii and xx are single bonds.

According to another embodiment, a method for enhancing the mechanical properties a polyester container is provided, the method comprising blending a polyester with creep control agent(s) to form a polyester composition. According to particular embodiments, the polyester composition can be formed into articles such as a container.

Furthermore, in another embodiment the step of forming the container comprises stretch blow molding. Particular embodiments provide polyester containers, such as PET containers, with enhanced mechanical properties. Other particular embodiments provide polyester containers with both enhanced mechanical properties and enhanced gas barrier properties, in particular, enhanced gas barrier to carbon dioxide and oxygen. This makes certain embodiments of the invention particularly suited for packaging carbonated soft drinks and oxygen sensitive beverages and foods. Particular embodiments achieve this enhanced gas barrier while maintaining acceptable physical properties and clarity.

Other objects, features, and advantages of this invention will become apparent from the following detailed description, drawings, and claims.

DETAILED DESCRIPTION

Figure 1:
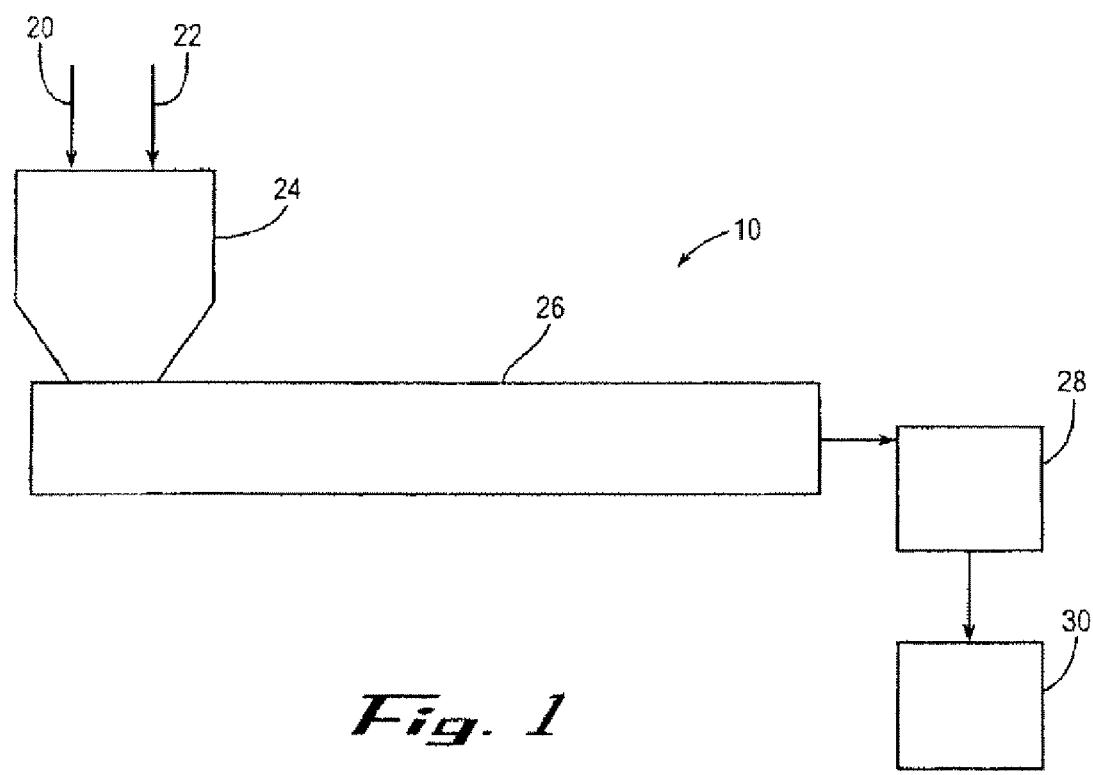
FIG. 1 is a schematic diagram of a system for making a PET container with enhanced gas barrier in accordance with an embodiment of this invention.

A polyester container with enhanced mechanical properties and a method for making a polyester container with enhanced mechanical properties are provided herein. Polyester containers and methods for making such containers made in accordance with embodiments of the present disclosure are further described below and in accompanying FIGS. 1-5.

I. Polyester Composition

Embodiments provided herein may be applicable to any polyester and may be suitable for uses in which a enhanced mechanical properties are desirable. Suitable polyesters for use in the embodiments provided herein may include PET copolymers, polyethylene naphthalate (PEN), polyethylene isophthalate, and the like. PET copolymers are particularly useful because they are used for many barrier applications such as films and containers. Suitable containers include, but are not limited to, bottles, drums, carafes, coolers, and the like.

Polyesters, including PET copolymers, have free volume between the polymer chains. As is known to those skilled in the art, the amount of free volume in polyesters such as PET copolymers determines their barrier to gas molecules. The lower the free volume, the lower the gas diffusion, and the higher the barrier to gas molecules. Generally, disposing gas barrier additives within the free volume has been found to improve the gas barrier properties of polyester compositions. Applicants have now discovered that the creep control agents provided herein also may enhance the polyester's gas barrier properties while also enhancing the polyester's mechanical properties.

In a particular embodiment, a polyester composition comprises a polyester and a creep control agent, which is further described below. The creep control agent of the polyester composition enhances the gas barrier properties of the polyester composition at low loading levels, desirably in the range of about 200 to about 2000 ppm of the polyester composition, more desirably in the range of about 500 to about 1000 ppm of the polyester composition, and still more desirably in the range of about 750 to about 1000 ppm of the polyester composition. The loading levels of the creep control agents should be maintained at a level which is sufficient to provide enhanced mechanical and gas barrier properties without significantly impairing such properties or the visual appearance of the polyester composition. For example, those skilled in the art should appreciate that hazy or discolored containers for packaged beverages are generally undesirable.

In particular embodiments, the polyester compositions provided herein may further comprise a suitable gas barrier enhancement additive. Suitable gas barrier enhancement additives are known to those skilled in the art; however, Applicants have discovered that the combination of the gas barrier enhancing additive with the creep control agents provided herein further enhances the gas barrier properties of the polyester composition. Such gas barrier enhancement additives are further described below, and are described in detail in co-pending U.S. patent application Ser. No. 12/629,379, U.S. Patent Publication No. 2005/0221036, U.S. Patent Publication No. 2006/0275568, and U.S. Patent Publication No. 2007/0082156, the disclosures of which are incorporated herein by reference in their entirety.

PET copolymers suitable for use in embodiments of this invention comprise a diol component having repeat units from ethylene glycol and a diacid component having repeat units from terephthalic acid. In particular embodiments, the PET copolymer has less than 20 percent diacid modification, less than 10 percent glycol modification, or both, based on 100 mole percent diacid component and 100 mole percent diol component. Such PET copolymers are well known.

The polyester may be made using any suitable polycondensation catalysts; however, Applicants previously discovered that specific polycondensation catalysts may be particularly suited when gas barrier enhancing additives are added to the polyester composition. Such polycondensation catalysts are disclosed in U.S. Patent Publication No. 2006/0275568. Accordingly, in embodiments in which the polyester composition further comprises a gas barrier enhancing additive, the polyester may be made using at least one first polycondensation catalyst selected from the group consisting of metals in groups 3, 4, 13, and 14 of the Periodic Table. The polyester composition may comprise a catalyst residue remaining in the polyester from formation of the polyester and the catalyst residue may comprise at least a portion of the at least one first polycondensation catalyst. In some embodiments, the catalyst residue may be present in the polyester composition in an amount up to 250 ppm, and is preferably less.

The gas barrier enhancing additive and the polyester may undergo a transesterification reaction and thereby cause problems in container applications, such as lowering the I.V. of the polyester composition to unacceptable levels. Transesterification reaction in PET copolymer resin is believed to be catalyzed by the residual polycondensation catalyst. Accordingly, in one embodiment the residual polycondensation catalyst in the polyester may be deactivated. One approach to deactivating these catalysts has been to add catalyst deactivating compounds, such as phosphorus containing compounds, to the polyester composition. Once the catalysts are deactivated, they will not catalyze the transesterification reaction and such reaction will be slowed down during the melt processing of the polyester, such as PET copolymer, and gas barrier enhancing additive blend. The phosphorus containing compounds include both organic and inorganic compounds. Examples include but are not limited to phosphoric acid, polyphosphoric acid, and tris(2,4-di-t-butylphenyl) phosphite, tris mononenylphenyl phosphite.

The polycondensation catalyst deactivating agent optionally may be added to the polyester composition in an amount sufficient to deactivate the polycondensation catalyst residue in the polyester composition so that the gas barrier enhancing additive is able to sufficiently enhance the gas barrier properties of the polyester composition and the resulting polyester container. For example, these additives may be added to the polyester composition in amounts less than 2000 ppm. In accordance with one embodiment, the polycondensation catalyst deactivating agent may be present in the polyester composition in amount from about 10 to about 500 ppm by weight of the polyester composition or in an amount from about 100 to about 500 ppm by weight of the polyester composition.

Despite the addition of the polycondensation deactivating agents, the extent of the deactivation of the polycondensation remains unclear and may not be sufficient to eliminate the degradation of the polyester through reaction with the barrier enhancing additives when certain polycondensation catalysts are used in the formation of the polyester by polycondensation reaction. Accordingly, in other embodiments the polyester composition may comprise a second polycondensation catalyst selected from the group consisting of cobalt, antimony, zinc, manganese, magnesium, cesium, calcium, and cadmium. Those skilled in the art should appreciate that the amount of the second polycondensation catalyst which is present in the polyester composition should be maintained below levels which may significantly lower the I.V. of the polyester composition below acceptable levels. Accordingly, in one embodiment the second polycondensation catalyst may be present in the polyester composition in an amount up to 3 ppm of the polyester composition. Specifically, the reactivity of traditional polycondensation catalysts such as cobalt, antimony, zinc, manganese, magnesium, cesium, calcium, calcium, and cadmium is not mitigated to the extent necessary to make use of the phosphorus-based deactivating agents a viable alternative compared to substantial reduction or elimination of the metal catalyst residues containing cobalt, antimony, zinc, manganese, magnesium, cesium, calcium, or cadmium.

Reaction between the gas barrier enhancing additive and the polyester composition can reduce the I.V. of the polyester composition and resulting container preform. PET with a significantly lower I.V. cannot be used in blow molding containers, such as beverage containers, because lower I.V. PET makes containers with poor mechanical performance, such as creep, drop impact resistance, and the like. Still further, PET containers made from lower I.V. PET generally have poor stress cracking resistance for carbonated soft drink applications, which is undesirable in container applications. In order to prepare container preforms and containers with adequate physical properties and an I.V. suitable for efficient molding of the preforms and blow molding of such preforms into containers, the polyester composition desirably has an I.V. of at least 0.65, more preferably from about 0.65 to about 1.0, and even more preferably from about 0.70 to about 0.86. The units for I.V. herein are all in dL/g measured according to ASTM D4603-96, in which the I.V. of PET based resin is measured at 30° C. with 0.5 weight percent concentration in a 60/40 (by weight) phenol/1,1,2,2-tetrachloroethane solution.

As discussed above, polyester having residual catalysts with minimal or no cobalt, antimony, zinc, manganese, magnesium, cesium, calcium, and cadmium substantially alleviates reduction in I.V. Total cobalt, antimony, zinc, manganese, magnesium, cesium, calcium, and cadmium content is desirably less than 3 ppm. According to a particular embodiment, suitable gas barrier enhancing additives for PET polymers and copolymers are blended with polyester having titanium and aluminum-based metal catalyst residues without the presence of residues containing cobalt, antimony, zinc, manganese, magnesium, cesium, calcium, or cadmium. The periodicity of the elements in the modern periodic table suggests that similar chemical reactivity exists throughout a group. As such, zirconium and halfnium may be useful as analogs for titanium catalysts, and gallium, indium, and thallium may be useful analogs of aluminum. Germanium, tin, and lead from group 14 may be suitable.

II. Creep Control Agents

In one aspect of this disclosure, the polyester composition comprises a creep control agent having the chemical structure of Formula I:

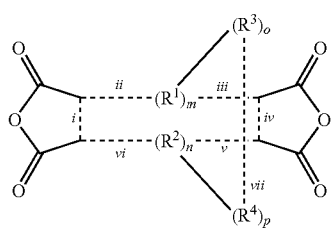

I wherein $R^1$, $R^2$, $R^3$, and $R^4$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, and vi, independent of one another, comprise a single, double, or triple bond; wherein when i is a double bond, ii and vi are single bonds; wherein when ii is a double bond, i and iii are single bonds; wherein when iii is a double bond, ii and iv are single bonds; wherein when iv is a double bond iii and v are single bonds; wherein when v is a double bond, iv and vi are single bonds; wherein when vi is a double bond, i and v are single bonds; wherein vii may be a single bond, double bond, or no bond at all connects $R^3$ and $R^4$;

wherein m, n, o, and p, independent of one another, may be 0 or 1; wherein when m is 0, bonds ii and iii form a single continuous bond; wherein when n is 0, bonds vi and v form a single continuous bond; wherein when o is 0, $R^4$ is bonded to $R^1$ by a single bond; and wherein when p is 0, $R^3$ is bonded to $R^2$ by a single bond.

In a particular embodiment of the compound of Formula I, wherein m, n, o, and p are 0; and i, iv, and v/vi are single bonds; the creep control agent comprises cyclobutane-1,2,3,4-tetracarboxylic acid dianhydride, a compound having the chemical structure:

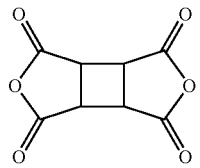

In another embodiment of the compound of Formula I, wherein n, o, and p are 0; m is 1; i, ii, iii, iv, and v/vi are single bonds; and $R^1$ is oxygen; the creep control agent comprises 2,3,4,5-tetrahydro-2,3,4,5-tetracarboxylic-furan dianhydride, a compound having the chemical structure:

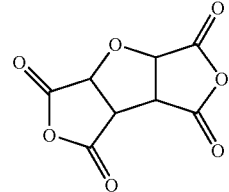

In yet another embodiment of the compound of Formula I, wherein m and n are 1; o and p are 0; $R^1$ and $R^2$ are trivalent hydrocarbons comprising 1 carbon atom; i, iii, and v are double bonds; and ii, iv, and vi are single bonds; the creep control agent comprises pyromellitic dianhydride, a compound having the chemical structure:

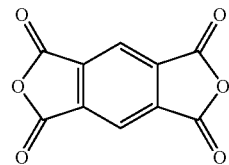

In yet another embodiment of the compound of Formula I, wherein m, n, o, and p are 1; $R^1$, $R^2$, $R^3$, and $R^4$ are trivalent hydrocarbons comprising 1 carbon atom; i, ii, iii, iv, v, and vi are single bonds; and vii is a double bond; the creep control agent comprises bicyclo[2.2.2]oct-3,4-ene-1,2,5,6-tetracarboxylic acid dianhydride, a compound having the chemical structure:

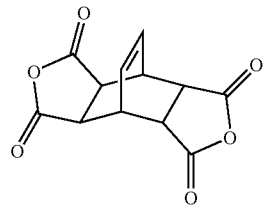

In another aspect of this disclosure, the polyester composition comprises a creep control agent having the chemical structure of Formula II:

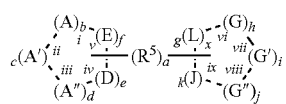

II wherein A, A', A", E, D, G, G', 0", L, and J, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, vi, vii, viii, ix, and x, independent of one another, may comprise a single or double bond; wherein when i is a double bond, ii and v are single bonds; wherein when ii is a double bond, i and iii are single bonds; wherein when iii is a double bond, ii and iv are single bonds; wherein when iv is a double bond, iii and v are single bonds; wherein when v is a double bond, i and iv are single bonds; wherein when vi is a double bond, vii and x are single bonds; wherein when vii is a double bond, vi and viii are single bonds; wherein when viii is a double bond, vii and ix are single bonds; wherein when ix is a double bond, viii and x are single bonds; wherein when x is a double bond, vi and ix are single bonds;

wherein b, c, d, e, f, g, h, i, j, and k, independent of one another may be 0 or 1;

wherein a may be 0 or 1; and wherein $R^5$ may be a heteroatom or a $C_1$-$C_{10}$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In one embodiment of the compound of Formula II, wherein b, c, d, e, f, g, h, k, are 1; a is 0; E and L are divalent hydrocarbons comprising 1 carbon atom; A', D, J, G' are trivalent hydrocarbons comprising 1 carbon atom; A and G" are oxygen; A" and G are nitrogen; i, ii, iv, v, vi, viii, ix, and x are single bonds; iii and vii are double bonds; and the ring comprising A, A', A", D, and E is bonded to the ring comprising G, G', G", L, and J via a single bond between D and J, the creep control agent is 4,'-bisoxazoline, a compound having the chemical structure:

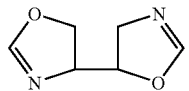

In another embodiment of the compound of Formula II, wherein b, c, d, e, f, g, h, j, and k are 1; a is 0; A', D, J, G' are trivalent hydrocarbons comprising 1 carbon atom; E and L are divalent hydrocarbons comprising 1 carbon atom; A and G are nitrogen; A" and G" are oxygen; ii and vii are double bonds; i, iii, iv, v, vi, viii, ix, and x are single bonds; and the ring comprising A, A', A", D, and E is bonded to the ring comprising G, G', 0", L, and J via a single bond between D and J, the creep control agent is 4,4'-bisoxazoline, a compound having the chemical structure:

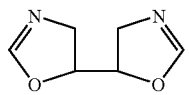

In yet another embodiment of the compound of Formula II, wherein b, c, d, e, f, g, h, i, j, and k are 1; a is 0; A" and G" are oxygen; E and L are nitrogen; J and D are tetravalent carbon atoms; A, A', G and G' are divalent hydrocarbons comprising 1 carbon atom; v and x are double bonds; i, ii, iii, iv, vi, vii, viii, and ix are single bonds; and the ring comprising A, A', A", D, and E is bonded to the ring comprising G, G', G", L, and J, via a single bond between D and J, the creep control agent is 2,2'-bix(2-oxazoline), a compound having the chemical structure:

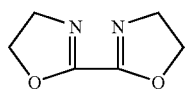

In yet another embodiment of the compound of Formula II, wherein a, b, c, d, e, f, g, h, i, j, and k are 1; A', D, J, G' are trivalent hydrocarbons comprising 1 carbon atom; $R^5$, E and L are divalent hydrocarbons comprising 1 carbon atom; A and G are nitrogen; A" and G" are oxygen; ii and vii are double bonds; i, iii, iv, v, vi, viii, ix, and x are single bonds; and $R^5$ is bonded to D and J, the creep control agent is bis(4,5-dihydrooxazol-5-yl)methane, a compound having the chemical structure:

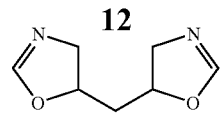

In yet another embodiment of the compound of Formula II, wherein d, e, f, g, k, j, and a are 1; b, c, h, and i are 0; E and L are oxygen; $R^5$, A", and G" are divalent hydrocarbons comprising 1 carbon atom; D, and J are trivalent hydrocarbons comprising carbon atom; iv, v, ix, and x are single bonds; E and A" are bonded directly together via a single bond; L and G" are bonded together via a single bond; and $R^5$ is bonded to D and J, the creep control agent is bis(4,5-dihydrooxazol-5-yl)methane, a compound having the chemical structure:

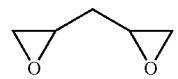

In another aspect of this disclosure, the polyester composition comprises a creep control agent having the chemical structure of Formula III:

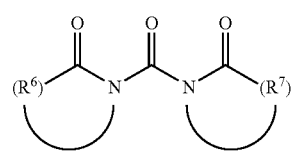

III wherein $R^6$ and $R^7$, independent of one another, may comprise a $C_1$-$C_5$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties.

In one particular embodiment of the compound of Formula III, wherein $R^6$ and $R^7$ are divalent hydrocarbons comprising 5 carbon atoms, the creep control agent is bis-carpolactam carbonyl, a compound having the chemical structure:

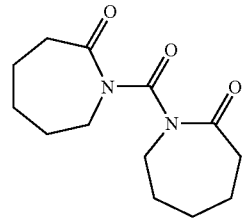

In yet another aspect of this disclosure, the polyester composition comprises a creep control agent having the chemical structure of Formula IV:

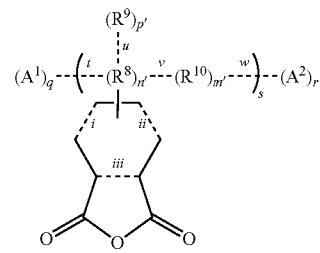

IV wherein $A^1$, $A^2$, $R^8$, $R^9$, and $R^{10}$, independent of one another, may comprise a heteroatom, a tetravalent carbon atom, a $C_1$-$C_{10}$ divalent or trivalent hydrocarbon, or a $C_1$-$C_{10}$ hydrocarbyl that may be unsubstituted or substituted with one or more functional moieties; wherein each heteroatom, tetravalent carbon atom, or $C_1$-$C_{10}$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein m', n', and p', independent of one another, may be 0 or 1;

wherein i, ii, and iii, independent of one another may be a single bond or a double bond;

wherein t, u, v, and w, independent of one another may be a single bond, double bond, or triple bond; and wherein q, r, and s may be from 0 to 10,000.

In one particular embodiment of the compound of Formula IV, wherein q, r, p', m' are 0; s and n' are 1; $R^8$ is isobenzofuran-1,3-dione; i, ii, and iii are double bonds; the creep control agent is biphenyl-2,3,2',3'-tetracarboxylic acid dianhydride, a compound with the chemical structure:

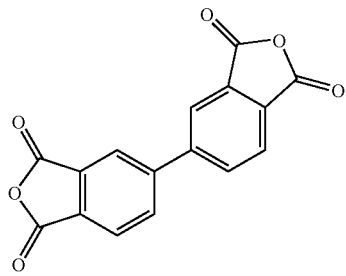

In another particular embodiment of the compound of Formula IV, wherein q, and r are 0; s, p', n', and m' are 1; $R^8$ comprises a tetravalent carbon atom; $R^9$ comprises oxygen; $R^{10}$ comprises isobenzofuran-1,3-dione; u, i, ii, and iii are double bonds; and v is a single bond, the creep control agent is benzophenone-3,4,3',4'-tetracarboxylic acid dianhydride, a compound with the chemical formula:

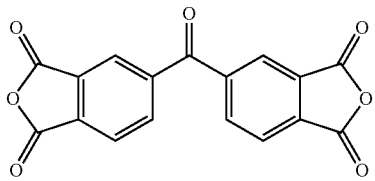

In another particular embodiment of the compound of Formula IV, wherein q and are 1000; r and p' are 0; m' and n' are 1; $R^8$ is a trivalent hydrocarbon comprising 1 carbon atom; $R^{10}$ is a divalent hydrocarbon comprising 1 carbon atom; t and v are single bonds; i, ii, and iii are double bonds; and $A^1$ is a methyl methacrylate monomer, the creep control agent is a co-polymer of 5-vinylisobenzofuran-1,3-dione and methyl methacrylate (MMA), a co-polymer with the chemical formula:

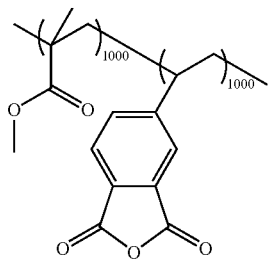

In another particular embodiment of the compound of Formula IV, wherein q and 1000; r and p' are 0; m' and n' are 1; $R^8$ is a trivalent hydrocarbon comprising 1 carbon atom; $R^{10}$ is a divalent hydrocarbon comprising one carbon atom; t and v are single bonds; i, ii, and iii are double bonds; and $A^1$ is a styrene monomer, the creep control agent is a co-polymer of 5-vinylisobenzofuran-1,3-dione and styrene, a co-polymer with the chemical formula:

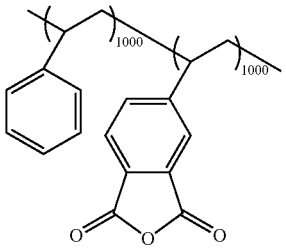

In yet another particular embodiment of the compound of Formula IV, wherein r, q, and s arc 1000; p' is 0; m' and n' are 1; $R^8$ is a trivalent hydrocarbon comprising 1 carbon atom; $R^{10}$ is a divalent hydrocarbon comprising one carbon atom; w, t, and v are single bonds; i, ii, and iii are double bonds; $A^1$ is a methyl methacrylate monomer; and $A^2$ is a styrene monomer, the creep control agent is a co-polymer of methyl methacrylate, 5-vinylisobenzofuran-1,3-dione, and styrene, a co-polymer with the chemical formula:

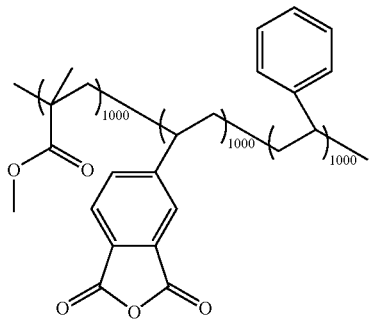

In another aspect of this disclosure, the polyester composition comprises a creep control agent having the chemical structure of Formula V:

V

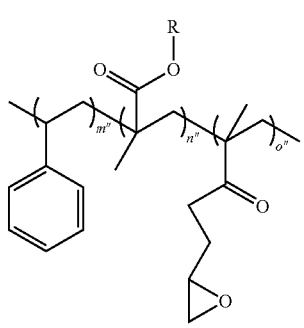

wherein R may comprise a heteroatom or a $C_1$-$C_{10}$ hydrocarbyl which may be unsubstituted or substituted with one or more functional moieties; and wherein m", n", and o", independent of one another, may be from 0 to 1,000.

Formula V represents the chemical structure of JONCRYL®-ADR, which is sold by BASF Corporation, Florham Park, N.J., 07932. The molecular weight of the polymer represented by Formula V is below about 3000.

In a particular embodiment of the compound of Formula V, wherein m", n", and o" are 100; and R is a methyl, the creep control agent is a co-polymer having the chemical structure:

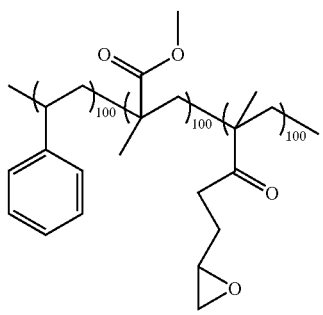

In yet another aspect of this disclosure, the polyester composition comprises a creep control agent having the chemical structure of Formula VI:

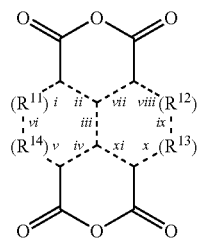

VI wherein $R^{11}$, $R^{12}$, $R^{13}$, and $R^{14}$, independent of one another, may comprise a heteroatom, tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, and xi, independent of one another, are a single bond or double bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, and xi are single bonds; wherein when v is a double bond, vi and iv are single bonds; wherein when vi is a double bond, i and v are single bonds; wherein when vii is a double bond, ii, iii, and viii are single bonds; wherein when viii is a double bond, vi and ix are single bonds; wherein when ix is a double bond, viii and x are single bonds; wherein when x is a double bond, ix and xi are single bonds; wherein when xi is a double bond, iv, x, and iii are single bonds.

In a particular embodiment of the compound of Formula VI, wherein $R^{11}R^{12}$, $R^{13}$, and $R^{14}$ are trivalent hydrocarbons comprising one carbon atom; vi, ii, iv, viii, and x are double bonds; and i, iii, v, vii, ix are single bonds, the creep control agent is 1,4,5,8-tetracarboxylic acid-naphthalene dianhydride, a compound having the chemical formula:

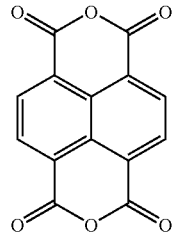

In yet another aspect of this disclosure, the polyester composition comprises a creep control agent having the chemical structure of Formula VII:

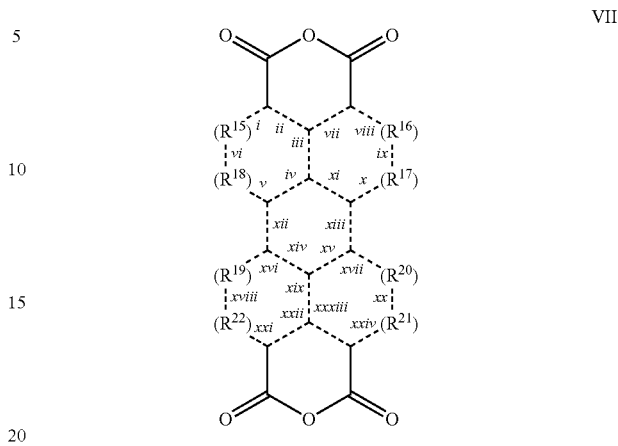

VII wherein $R^{15}$, $R^{16}$, $R^{17}$, $R^{18}$, $R^{19}$, $R^{20}$, $R^2$, and $R^{22}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, xi, xii, xiii, xiv, xv, xvi, xvii, xviii, xix, xx, xxi, xxii, independent of one another, are a double bond or single bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, xi, and xii are single bonds; wherein when v is a double bond, vi, iv, and xii are single bonds; wherein when vi is a double bond, i and v are single bonds; wherein when vii is a double bond, ii, iii and viii are single bonds; wherein when viii is a double bond, vii and ix are single bonds; wherein when ix is a double bond, viii and x are single bonds; wherein when x is a double bond, ix, xi, and xiii are single bonds; wherein when xi is a double bond, iii, iv, xiii and x are single bonds; wherein when xii is a double bond, v, iv, xvi, and xiv are single bonds; wherein when xiv is a double bond, xii, xvi, xv, and xix are single bonds; wherein when xv is a double bond, xiii, xvii, xiv, and xix are single bonds; when xiii is a double bond, xi, x, xv, and xvii are single bonds; when xvi is a double bond, xii, xiv, and xviii are single bonds; wherein when xviii is a double bond, xvi and xxi are single bonds; wherein when xxi is a double bond, xviii and xxii are single bonds; wherein when xxii is a double bond, xxi, xix, and xxiii are single bonds; wherein when xix is a double bond, xiv, xv, xxii, and xxiii are single bonds; wherein when xxiii is a double bond, xix, xxii, and xxiv are single bonds; wherein when xxiv is a double bond, xxiii and xx are single bonds; wherein when xx is a double bond, xvii and xxiv are single bonds; and wherein when xvii is a double bond, xv, xiii and xx are single bonds.

In a particular embodiment of the compound of Formula VI, wherein $R^{15}$, $R^{16}$, $R^{17}$, $R^{18}$, $R^{19}$, $R^{20}$, $R^{21}$, and $R^{22}$ are trivalent hydrocarbons comprising 1 carbon atom; ii, iv, vi, viii, x, xiv, xvii, xviii, xxii, and xxiv are double bonds, and i, III, v, vii, xi, xii, xiii, ix, xv, xvi, xix, xxi, xxiii, and xx are single bonds; the creep control agent is perylene-3,4,9,10-tetracarboxylic acid dianhydride, a compound having the chemical structure:

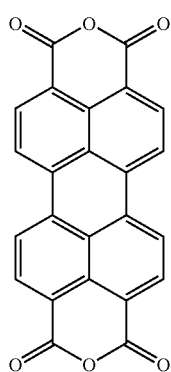

As used herein, the term "heteroatom" refers to any atom other than carbon or hydrogen. Typically, the heteroatom comprises nitrogen, oxygen, or sulfur.

The term "hydrocarbyl," as used herein, is used to describe a monovalent hydrocarbon that may form one bond with another atom within a single chemical compound. The term "divalent hydrocarbon," as used herein, is used to describe a hydrocarbon which may form two bonds to either one other atom as a double bond, or two other atoms as separate single bonds, all within a single chemical compound. The term "trivalent hydrocarbon," as used herein, is used to describe a hydrocarbon which may form three bonds to either one other atom as a triple bond, two other atoms as a double and single bond, or three atoms as separate single bonds, all within a single chemical compound. A "tetravalent carbon atom," as used herein, is used to describe a carbon atom that may form four bonds to either two other atoms as one triple bond and one single bond, two other atoms as two double bonds, three different atoms as one double bond and two single bonds, or four different atoms as four separate single bonds, all within a single chemical compound.

The terms "hydrocarbon" and "hydrocarbyl," as used herein, include an aliphatic group, an aromatic or aryl group, a cyclic group, a heterocyclic group, or any combination thereof and any substituted derivative thereof, including but not limited to, a halide, an alkoxide, or an amide-substituted derivative thereof. Also included in the definition of the hydrocarbyl are any unsubstituted, branched, or linear analogs thereof. The hydrocarbyl may be substituted with one or more functional moieties as described hereinbelow.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, and decyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl.

Examples of aryl or aromatic moieties include, but are not limited to, azulenyl, biphenyl, fluorenyl, indan, indenyl, naphthyl, phenyl, 1,2,3,4-tetrahydro-naphthalene, and the like, including substituted derivatives thereof, in each instance having from 6 to about 10 carbons. Substituted derivatives of aromatic compounds include, but are not limited to, tolyl, xylyl, mesityl, and the like, including any heteroatom substituted derivative thereof. Examples of cyclic groups, in each instance, include, but are not limited to, cycloparaffins, cycloolefins, cycloacetylenes, arenes such as phenyl, bicyclic groups and the like, including substituted derivatives thereof. Thus heteroatom-substituted cyclic groups and bicyclic groups such as furanyl and isosorbyl are also included herein.

In each instance, aliphatic and cyclic groups are groups comprising an aliphatic portion and a cyclic portion, examples of which include, but are not limited to, groups such as: —$(CH_2)_m C_6H_q M_{5-q}$ wherein m is an integer from 1 to about 10, q is an integer from 1 to 5, inclusive; $(CH_2)_m C_6H_q R_{10-4}$ wherein in is an integer from 1 to about 10, q is an integer from 1 to 10, inclusive; and $(CH_2)_m C_5H_q R_{9-q}$ wherein m is an integer from 1 to about 10, q is an integer from 1 to 9, inclusive. In each instance and as defined above, M is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 10 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$C_{1-2}CH_2C_6H_4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer thereof, or any substituted derivative thereof.

In each instance, the heterocycle, which comprises at least one heteroatom may be selected from the group consisting of: morpholinyl, thiomorpholinyl, thiomorpholinyl S-oxide, thiomorpholinyl S,S-dioxide, piperazinyl, homopiperazinyl, pyrrolidinyl, pyrrolinyl, tetrahydropyranyl, piperidinyl, tetrahydrofuranyl, tetrahydrothienyl, homopiperidinyl, homomorpholinyl, homothiomorpholinyl, homothiomorpholinyl S,S-dioxide, oxazolidinonyl, dihydropyrazolyl, dihydropyrrolyl, dihydropyrazinyl, dihydropyridinyl, dihydropyrimidinyl, dihydrofuryl, dihydropyranyl, tetrahydrothienyl S-oxide, tetrahydrothienyl S,S-dioxide, and homothiomorpholinyl S-oxide, pyridinyl, pyrimidinyl, quinolinyl, benzothienyl, indolyl, indolinyl, pyridazinyl, pyrazinyl, isoindolyl, isoquinolyl, quinazolinyl, quinoxalinyl, phthalazinyl, imidazolyl, isoxazolyl, pyrazolyl, oxazolyl, thiazolyl, indolizinyl, indazolyl, benzothiazolyl, benzimidazolyl, benzofuranyl, furanyl, thienyl, pyrrolyl, oxadiazolyl, thiadiazolyl, triazolyl, tetrazolyl, oxazolopyridinyl, imidazopyridinyl, isothiazolyl, naphthyridinyl, cinnolinyl, carbazolyl, beta-carbolinyl, isochromanyl, chromanyl, tetrahydroisoquinolinyl, isoindolinyl, isobenzotetrahydrofuranyl, isobenzotetrahydrothienyl, isobenzothienyl, isosorbyl, benzoxazolyl, pyridopyridinyl, benzotetrahydrofuranyl, benzotetrahydrothienyl, purinyl, benzodioxolyl, triazinyl, phenoxazinyl, phenothiazinyl, pteridinyl, benzothiazolyl, imidazopyridinyl, imidazothiazolyl, dihydrobenzisoxazinyl, benzisoxazinyl, benzoxazinyl, dihydrobenzisothiazinyl, benzopyranyl, benzothiopyranyl, coumarinyl, isocumarinyl, chromonyl, chromanonyl, pyridinyl-N-oxide, tetrahydroquinolinyl, dihydroquinolinyl, dihydroquinolinonyl, dihydroisoquinolinonyl, dihydrocumarinyl, dihydroisocoumarinyl, isoindolinonyl, benzodioxanyl, benzoxazolinonyl, pyrrolyl N-oxide, pyrimidinyl N-oxide, pyridazinyl N-oxide, pyrazinyl N-oxide, quinolinyl N-oxide, indolyl N-oxide, indolinyl N-oxide, isoquinolyl N-oxide, quinazolinyl N-oxide, quinoxalinyl N-oxide, phthalazinyl N-oxide, imidazolyl N-oxide, isoxazolyl N-oxide, oxazolyl N-oxide, thiazolyl N-oxide, indolizinyl N-oxide, indazolyl N-oxide, benzothiazolyl N-oxide, benzimidazolyl N-oxide, pyrrolyl N-oxide, oxadiazolyl N-oxide, thiadiazolyl N-oxide, triazolyl N-oxide, tetrazolyl N-oxide, benzothiopyranyl S-oxide, or benzothiopyranyl S,S-dioxide.

The term alkoxy, as used herein, and unless otherwise specified, refers to a moiety of the structure —O-alkyl, wherein alkyl is as defined above.

The term acyl, as used herein, refers to a group of the formula C(O)R', wherein R' is an alkyl, aryl, heteroaryl, heterocyclic, alkaryl or aralkyl group, or substituted alkyl, aryl, heteroaryl, heterocyclic, aralkyl or alkaryl, wherein these groups are as defined above.

Unless otherwise indicated, the term "substituted," when used to describe a chemical structure or moiety, refers to a derivative of that structure or moiety wherein one or more of its hydrogen atoms is substituted with a chemical moiety or functional group. Non-limiting examples of suitable functional moieties, as used herein, include halide, hydroxyl, amino, amido, alkylamino, arylamino, alkoxy, aryloxy, nitro, acyl, cyano, sulfo, sulfato, mercapto, imino, sulfonyl, sulfenyl, sulfonyl, sulfamoyl, phosphonyl, phosphinyl, phosphoryl, phosphino, thioester, thioether, anhydride, oximno, hydrazino, carbamyl, phosphonic acid, phosphonato, ether, ketone, ester, and any other viable functional group.

III. Gas Barrier Additive Compositions

The gas barrier enhancing additives provided herein generally comprise gas barrier additives having decreased volatility as compared to previously discovered gas barrier additives. As used herein, the terms "gas barrier enhancing additive," "gas barrier enhancement additive," and "gas barrier additive" are synonymous and may be used interchangeably.

In an embodiment, a gas barrier enhancing additive having the chemical structure of Formula I or Formula II is provided:

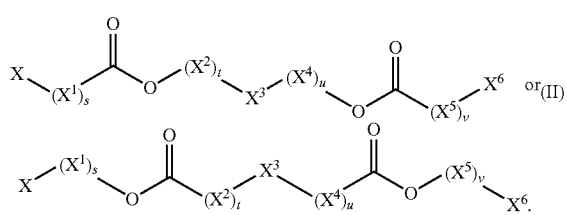

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfonyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which may be unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon may be unsubstituted or substituted with one or more functional moieties or one or more $C_1$-$C_{10}$ hydrocarbyls that may be unsubstituted or substituted with one or more functional moieties; and wherein s, t, u, and v, independent of one another, may be a number from 0 to 10.

In particular embodiments, when $X^3$ may comprise a $C_6$ or $C_{10}$ divalent aromatic hydrocarbon, X and $X^6$, independent of one another, may comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon which may be unsubstituted or substituted with one or more functional moieties.

In an embodiment of the compound of Formula I, wherein X and $X^6$ each comprise a phenyl group, the gas barrier additive comprises a compound having the chemical structure:

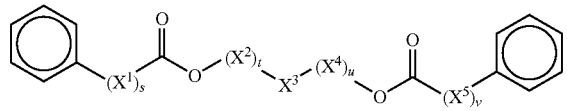

In an embodiment of the compound of Formula I, wherein X and $X^6$ each comprise a phenyl group and s and v are 0, the gas barrier additive comprises a compound having the chemical structure:

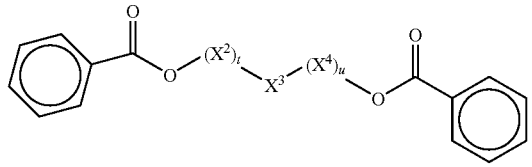

In an embodiment of the compound of Formula I, wherein X and $X^6$ each comprise a phenyl group and s, t, u, and v are 0, the gas barrier additive comprises a compound having the chemical structure:

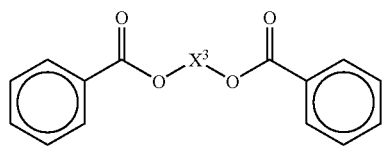

In an embodiment of the compound of Formula I, wherein X and $X^6$ each comprise a phenyl group, s, t, u and v are 0, and $X^3$ comprises a divalent isosorbide, the gas barrier additive comprises dibenzoyl isosorbide, a compound having the chemical structure:

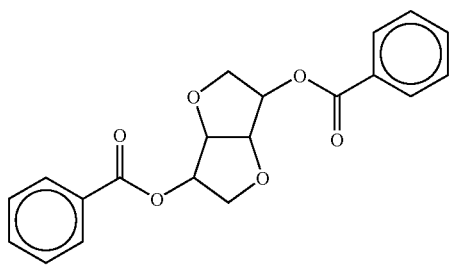

In an embodiment of the compound of Formula I, wherein X and $X^6$ comprise a phenyl group, s, t, u, and v are 0, and $X^3$ comprises a divalent cyclohexane, the gas barrier additive comprises a compound having the chemical structure:

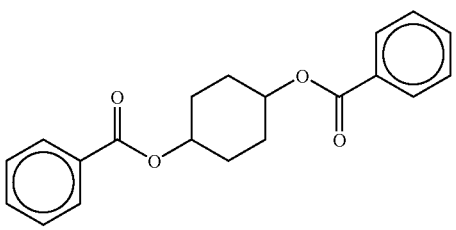

In an embodiment of the compound of Formula I, wherein X and $X^6$ each comprise a phenyl group, s and v are 0, t and u are 1, and $X^2$ and $X^4$ each comprise a divalent $C_1$ hydrocarbon, the gas barrier additive comprises a compound having the chemical structure:

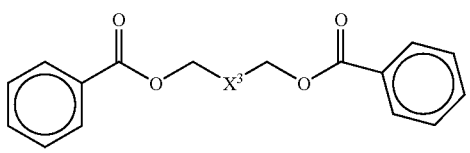

In an embodiment of the compound of Formula I, wherein X and $X^6$ each comprise a phenyl group, s and v are 0, t and u are 1, $X^2$ and $X^4$ each comprise a divalent $C_1$ hydrocarbon, and $X^3$ comprises a divalent hydro bi-furan, the gas barrier additive comprises a compound having the chemical structure:

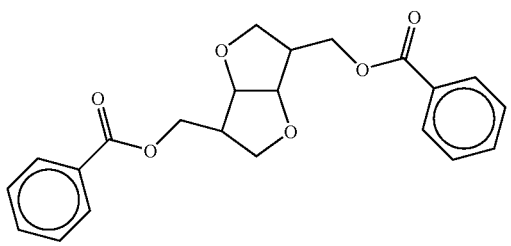

In an embodiment of the compound of Formula I, wherein X and $X^6$ comprise a phenyl group, s and v are 0, t and u are 1, $X^2$ and $X^4$ comprise a divalent $C_1$ hydrocarbon, and $X^3$ comprises a divalent cyclohexane, the gas barrier additive comprises cyclohexane-1,4-diylbis(methylene)dibenzoate, a compound having the chemical structure:

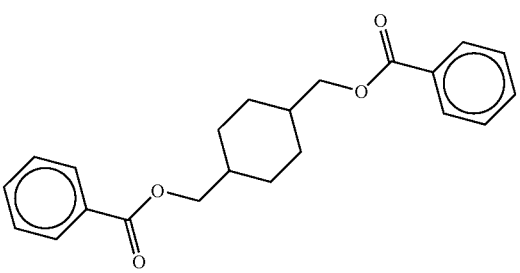

In an embodiment of the compound of Formula I, wherein X and $X^6$ each comprise a naphthyl group, the gas barrier additive comprises a compound having the chemical structure:

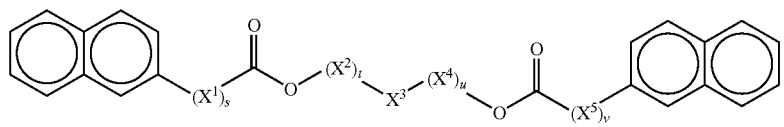

In an embodiment of the compound of Formula I, wherein X and $X^6$ each comprise a naphthyl group and s and v are 0, the gas barrier additive comprises a compound having the chemical structure:

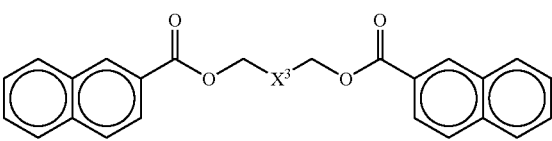

In an embodiment of the compound of Formula I, wherein X and $X^6$ each comprise a naphthyl group, s and v are 0, t and u are 1, and $X^2$ and $X^4$ each comprise a divalent $C_1$ hydrocarbon, the gas barrier additive comprises a compound having the chemical structure:

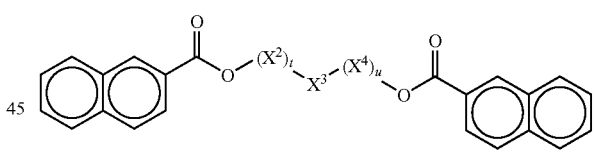

In an embodiment of the compound of Formula I, wherein X and $X^6$ each comprise a naphthyl group, s and v are 0, t and u are 1, each $X^2$ and $X^4$ comprise a divalent $C_1$ hydrocarbon, and $X^3$ comprises a divalent cyclohexane which may be ortho-, meta-, or para-substituted, the gas barrier additive comprises a compound having the chemical structure:

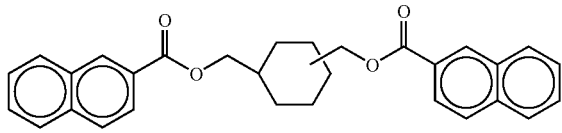

For example, in a particular embodiment wherein the divalent cyclohexane is para-substituted, the gas barrier additive comprises cyclohexane-1,4-diylbis(methylene)di-2-naphthoate, a compound having the chemical structure:

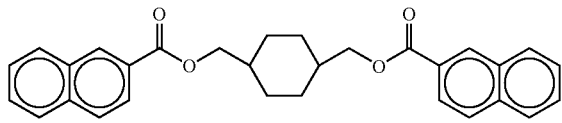

In an embodiment of the compound of Formula II, wherein X and $X^6$ each comprise a cyclohexyl group, the gas barrier additive comprises a compound having the chemical structure:

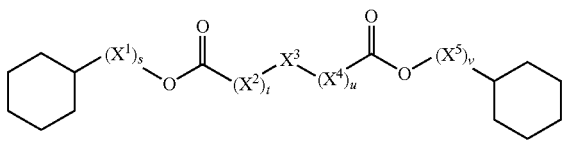

In an embodiment of the compound of Formula II, wherein. X and $X^6$ each comprise a cyclohexyl group and s and v are 0, the gas barrier additive comprises a compound having the chemical structure:

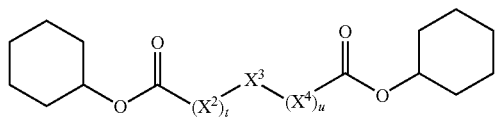

In an embodiment of the compound of Formula II, wherein. X and $X^6$ each comprise a cyclohexyl group and s, t, u, and v are 0, the gas barrier additive comprises a compound having the chemical structure:

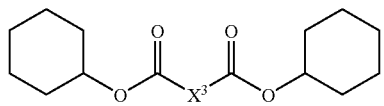

In an embodiment of the compound of Formula H, wherein X and $X^6$ each comprise a cyclohexyl group, s, t, u, and v are 0, and $X^3$ comprises a divalent benzene which may be ortho-, meta-, or para-substituted, the gas barrier additive comprises a compound having the chemical structure:

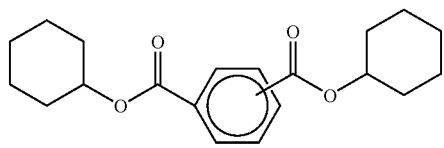

For example, in a particular embodiment wherein the divalent benzene is para-substituted, the gas barrier additive comprises dicyclohexyl terephthalate, a compound having the chemical structure:

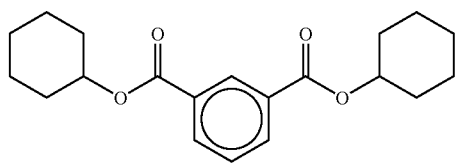

In another embodiment the divalent benzene may be meta-substituted such that the gas barrier additive comprises dicyclohexyl isophthalate, a compound having the chemical structure:

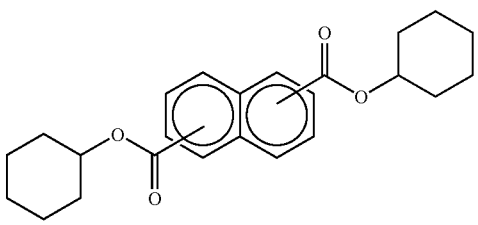

In an embodiment of the compound of Formula II, wherein X and $X^6$ each comprise a cyclohexyl group, s, t, u, and v are 0, and $X^3$ comprises a divalent naphthalene which may be substituted at any position on either ring (e.g., 1, 2, 3, 4, 5, 6, 7, or 8), the gas barrier additive comprises a compound having the chemical structure:

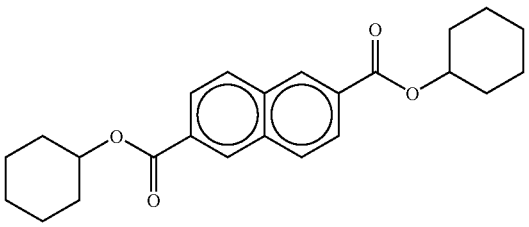

For example, in a particular embodiment wherein the divalent naphthalene is substituted at the 2 and 6 positions, the gas barrier additive comprises dicyclohexyl naphthalene-2,6-dicarboxylate, a compound having the chemical structure:

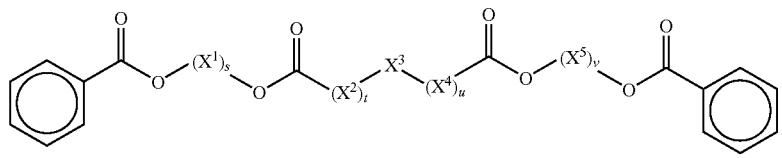

In an embodiment of the compound of Formula II, wherein X and $X^6$ each comprise a benzoate group, the gas barrier additive comprises a compound having the chemical structure:

In an embodiment of the compound of Formula II, wherein X and $X^6$ each comprise a benzoate group and t and u are 0, the gas barrier additive comprises a compound having the chemical structure:

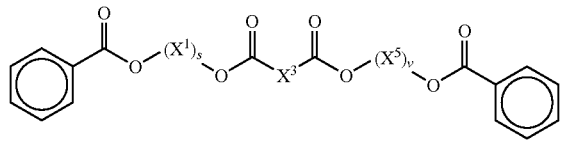

In an embodiment of the compound of Formula II, wherein X and $X^6$ each comprise a benzoate group, t and u are 0, s and v are 1, and $X^1$ and $X^5$ each comprise a divalent $C_1$ hydrocarbon, the gas barrier additive comprises a compound having the chemical structure:

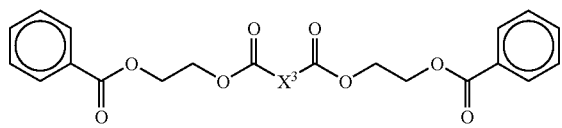

In an embodiment of the compound of Formula II, wherein X and $X^6$ each comprise a benzoate group, t and u are 0, s and v are 1, and $X^1$ and $X^5$ each comprise a divalent $C_1$ hydrocarbon, and $X^3$ is a divalent benzene which may be ortho-, meta-, or para-substituted, the gas barrier additive comprises a compound having the chemical structure:

In a particular embodiment wherein the divalent benzene is para-substituted, the gas barrier additive comprises bis(2-(benzoyloxy)ethyl) terephthalate), a compound having the chemical structure:

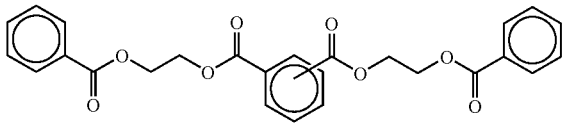

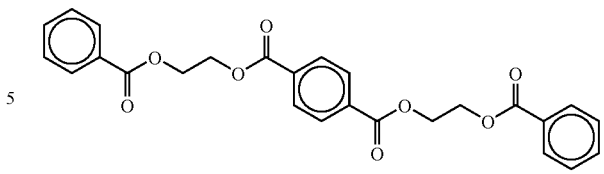

In an embodiment of the compound of Formula II, wherein X and $X^6$ each comprise a benzoate group, the gas barrier additive comprises a compound having the chemical structure:

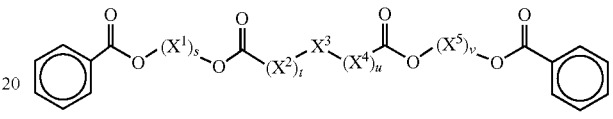

In an embodiment of the compound of Formula II, wherein X and $X^6$ each comprise a benzoate group, s and v are 2, and $X^1$ and $X^5$ each comprise a divalent $C_1$ hydrocarbon, the gas barrier additive comprises a compound having the chemical structure:

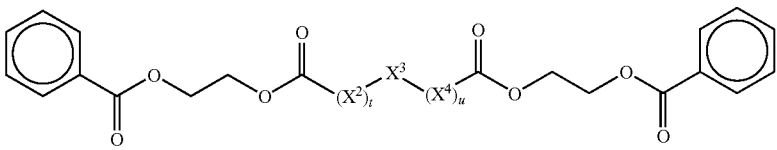

In an embodiment of the compound of Formula II, wherein X and $X^6$ each comprise a benzoate group, s and v are 2, $X^1$ and $X^5$ each comprise a divalent $C_1$ hydrocarbon, t and u are 1, and $X^2$ and $X^4$ each comprise a divalent benzoate which may be ortho-, meta-, or para-substituted, the gas barrier additive comprises a compound having the chemical structure:

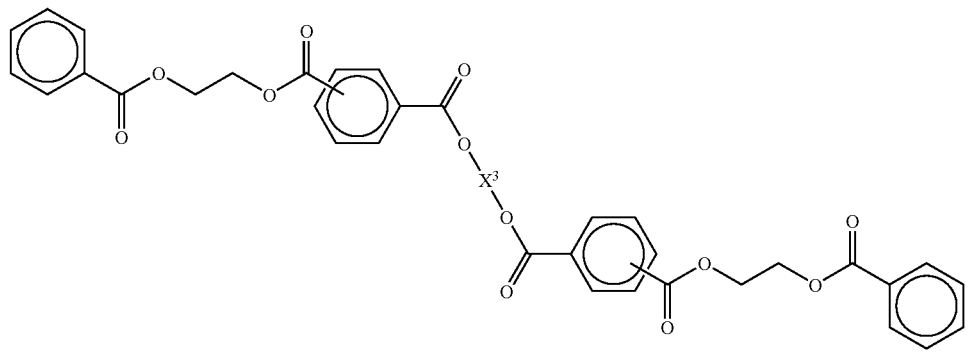

In an embodiment of the compound of Formula II, wherein X and $X^6$ each comprise a benzoate group, s and v are 2, $X^1$ and $X^5$ each comprise a divalent $C_1$ hydrocarbon, t and u are 1, $X^2$ and $X^4$ each comprise a divalent benzoate which may be ortho-, meta-, or para-substituted, and $X^3$ comprises a divalent $C_2$ hydrocarbon, the gas barrier additive comprises a compound having the chemical structure:

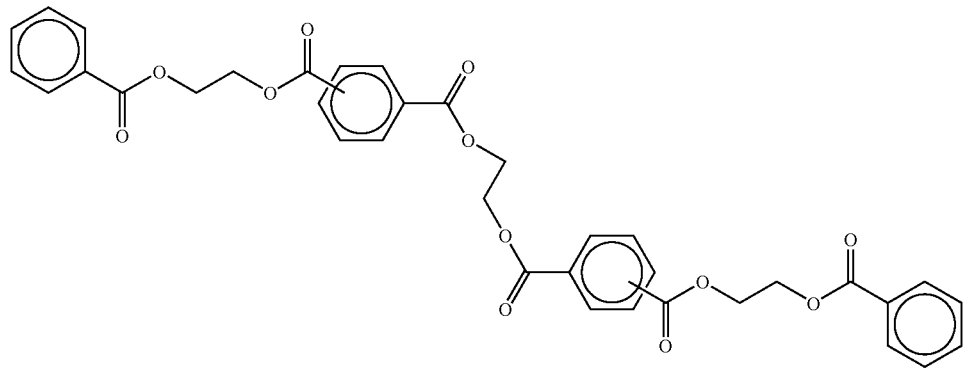

In a particular embodiment wherein the divalent benzoates are meta-substituted, the gas barrier additive comprises bis(2-(benzoyloxy)ethyl)'-ethane-1,2-diyl diisophthalate, a compound having the chemical structure:

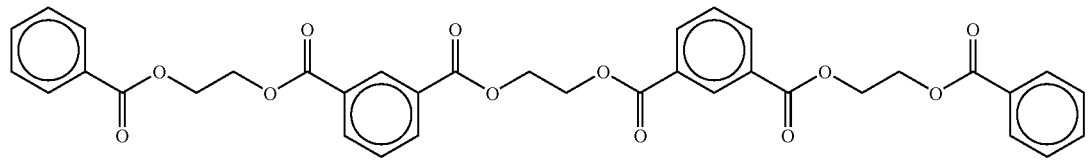

In an embodiment of the compound of Formula II, wherein X and $X^6$ each comprise an aryloxy group (e.g., a phenoxy group), the gas barrier additive comprises a compound having the chemical structure:

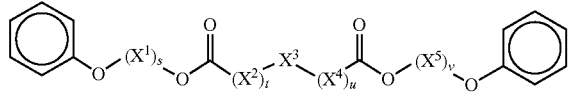

In an embodiment of the compound of Formula II, wherein X and $X^6$ each comprise an aryloxy group (e.g., a phenoxy group), t and u are 0, the gas barrier additive comprises a compound having the chemical structure:

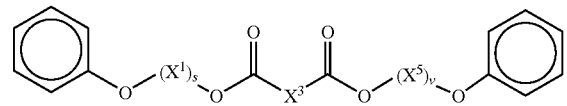

In an embodiment of the compound of Formula H, wherein X and $X^6$ each comprise an aryloxy group (e.g., a phenoxy group), t and u are 0, and $X^3$ comprises a divalent benzene which may be ortho-, meta-, or para-substituted, the gas barrier additive comprises a compound having the chemical structure:

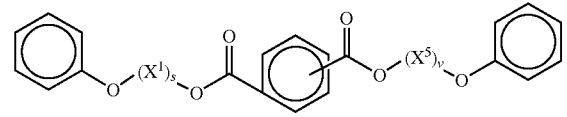

In an embodiment of the compound of Formula II, wherein X and $X^6$ each comprise an aryloxy group (e.g., a phenoxy group), t and u are 0, s and v are 1, $X^1$ and $X^5$ comprise a straight-chain divalent $C_2$ hydrocarbon, and $X^3$ comprises a divalent benzene which may be ortho-, meta-, or para-substituted, the gas barrier additive comprises a compound having the chemical structure:

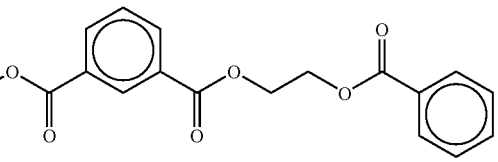

For example, in a particular embodiment wherein the divalent benzene is para-substituted, the gas barrier additive comprises bis(2-phenoxyethyl)terephthalate (PEM), a compound having the chemical structure:

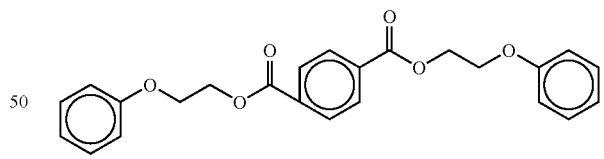

Other gas barrier enhancing additives suitable for use in embodiments provided herein are known to those skilled in the art, non-limiting examples of which are disclosed in U.S. Patent Publication No. 2005/0221036, U.S. Patent Publication No. 2006/0275568, and U.S. Patent Publication No. 2007/0082156, the disclosures of which are incorporated herein by reference in their entirety.

IV. Methods of Making Polyester Composition and Containers

As described above, the polyester compositions provided herein are useful for making containers in which enhanced mechanical properties and enhanced gas barrier are desirable. In short, such containers are made by forming the above described polyester compositions into the desired container by conventional methods such as melt forming. Suitable melt forming processes include, but are not limited to, injection molding, extrusion, thermal forming and compression molding. The particularly preferred method for making the containers of this invention is stretch blow molding.

Methods for incorporating the creep control agents and optional gas barrier enhancing additive into the container and polyester composition are also provided herein. Such methods also are well known to those skilled in the art. For example, an additive can be fed directly into the polyester during the injection molding process, preblended with the polyester resin prior to injection molding, or incorporated at high concentrations with PET as masterbatch and then blended with the polyester resin prior to injection molding of the container. Those skilled in the art will appreciate that such methods may be modified depending on the form of the additive being used. For example, when using additives in powder form, the polyester resin may be ground to reduce the size of the pellets and facilitate the formation of a homogeneous blend.

FIG. 1 illustrates a system 10 in accordance with an embodiment of this invention for making a rigid container preform 12 (illustrated in FIG. 2) and a rigid container 14 (illustrated in FIG. 3) from the preform. As is shown in FIG. 1, PET 20 and a creep control agent 22 and optionally a gas barrier enhancing additive, are added to a feeder or hopper 24 that delivers the components to a hot melt extruder 26 in which the components are melted and blended. The hot melt extruder 26 then extrudes the molten mixture of PET 20 and the creep control agent 22 into an injection molding device 28 to form the preform 12. The preform 12 is cooled and removed from the injection molding device 28 and delivered to a stretch blow molding device 30 which stretch blow molds the preform 12 into a finished rigid container 14.

The melt residence time of the preform production is preferably less than five minutes and more preferably from about one to about three minutes. The melt temperatures are desirably from about 270 to about 300° C. and more desirably from about 270 to about 290° C. The melt residence time begins when the PET 20 and creep control agent 22 enter the melt extruder 26 and start melting, and ends after injection of the molten blend into the injection mold to form the preform 12.

V. Containers

As is well known to those skilled in the art, containers can be made by blow molding a container preform. Examples of suitable preform and container structures are disclosed in U.S. Pat. No. 5,888,598, the disclosure of which as it relates to the preform and container structures being expressly incorporated herein by reference in its entirety.

Figures 2, 3, 4:
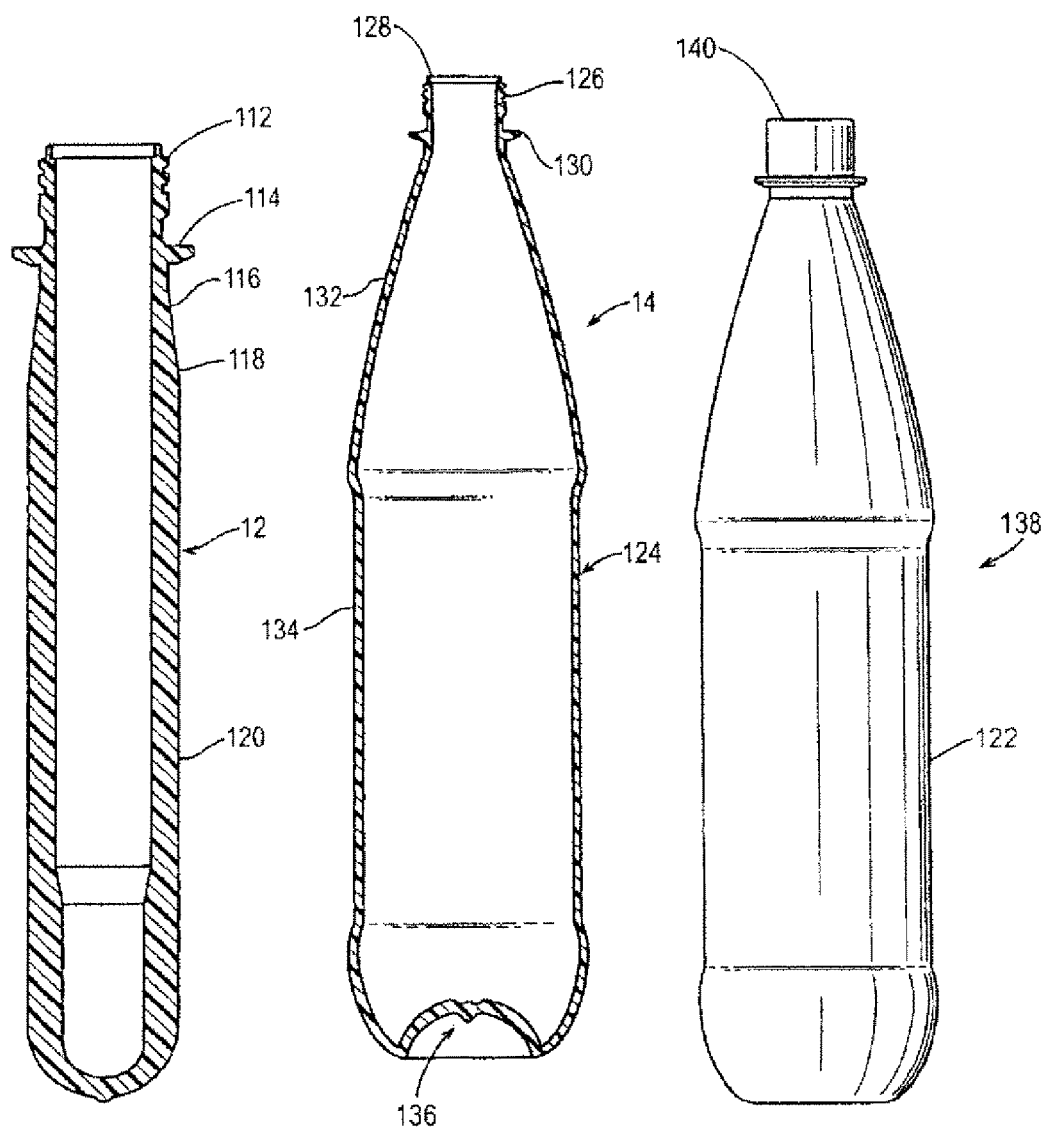
FIG. 2 is a sectional elevation view of a molded container preform made in accordance with an embodiment of this invention.
FIG. 3 is a sectional elevation view of a blow molded container made from the preform of FIG. 2 in accordance with an embodiment of this invention.
FIG. 4 is a perspective view of a packaged beverage made in accordance with an embodiment of this invention.
Figure 5:
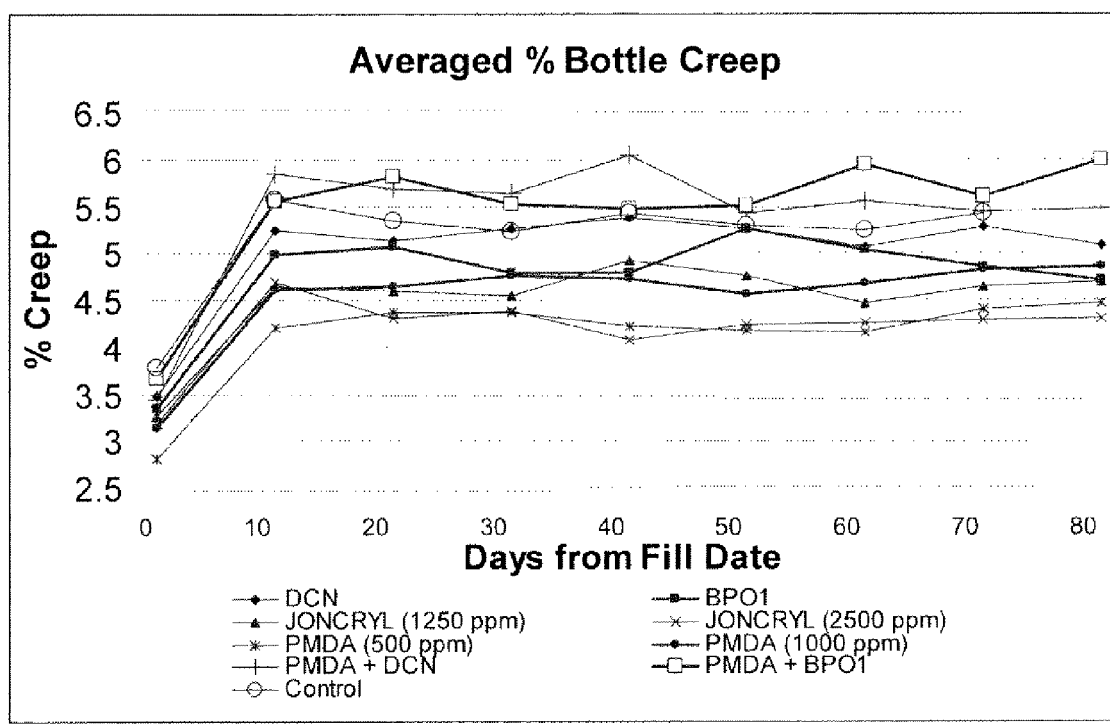
FIG. 5 is a graphical illustration of the average percent creep for containers made in accordance with embodiments of this invention.

A polyester container preform 12 is illustrated in FIG. 2. This preform 12 is made by injection molding PET based resin and comprises a threaded neck finish 112 which terminates at its lower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

The preform 12 illustrated in FIG. 2 can be stretch blow molded to form a container 14 illustrated in FIGS. 3 and 4. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 4. The packaged beverage 138 includes a beverage such as a carbonated soda beverage disposed in the container 14 and a closure 140 sealing the mouth 128 of the container.

The polyester container optionally may comprise a plurality of layers. Those skilled in the art will appreciate that the polyester composition comprising the polyester and gas barrier additive may be disposed in any of the one or more layers of such multilayer containers. For example, the polyester composition comprising the polyester and gas barrier enhancing additive may be disposed between two or more outer layers.

The preform 12, container 14, and packaged beverage 138 are but examples of applications using the preforms of the present disclosure. It should be understood that the process and apparatus provided herein can be used to make preforms and containers having a variety of configurations.

The present disclosure is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLES

Example 1

Preparation of Preforms and Stretch Blow Molded Containers

A polyester composition was prepared by blending a round 1103 polyester resin (Invista, Spartanburg, S.C.), with 500 to 2500 ppm of the creep control agents pyromellitic dianhydride (PMDA) and JONCRYL®.

The polyester composition was injection molded using conventional methods to obtain a container preform. The container preforms appeared to be of good quality in terms of clarity and shape without any indication of buildup on the core pin or in the thread splits and other parts of the injection molder, indicating there was no substantial plate-out on the injection molding equipment. The container preforms then were stretch blow molded using conventional methods to obtain bottles which were clear, colorless to the eye, and indistinguishable from one another.

Example 2

Shelf Life and Barrier Improvement Factor of PET Containers Comprising Creep Control Agents Containers were prepared as described in Example 1 using the above-described polyester, both alone and in combination with 500-2500 ppm of a creep control agent. The creep control agents included PMDA and JONCRYL®.

The containers were tilled with dry ice to achieve an internal pressure of 56 psi. The loss rate of carbon dioxide from the bottles was measured at 22° C. and 50% RH using the method described in U.S. Pat. No. 5,473,161, which is hereby incorporated by reference in its entirety. The barrier improvement factor (BIF) was defined as the ratio of the carbon dioxide loss rate of the polyester container without additive divided by the carbon dioxide loss rate of the polyester container with additive. The shelf life of the simulated carbonated soft drink for each container also was calculated as described by U.S. Pat. No. 5,473,161. The results are summarized in the table below.

TABLE 1

Summary of Container Shelf Life and BIF

|  | Control | 500 ppm PMDA | 1000 ppm PMDA | 1250 ppm JONCRYL ® | 2500 ppm JONCRYL ® |
| --- | --- | --- | --- | --- | --- |
| Shelf Life (Weeks) | 7.24 | 9.46 | 9.01 | 10.15 | 10.11 |
| BIF | — | 1.13 | 1.19 | 1.20 | 1.22 |

Example 3

Shelf Life and Barrier Improvement Factor of PET Containers Comprising Creep Control Agents and Gas Barrier Additives Containers were prepared using the above-described polyester both alone and in combination with various creep control agents and gas barrier additives. The shelf life and barrier improvement factor of the containers were determined as described in Example 2.

TABLE 2

Summary of Container Shelf Life, and BIF

| Polyester Composition | Shelf Life (weeks) | BIF |
| --- | --- | --- |
| Control | 7.24 | — |
| 3 wt % DCN | 7.75 | 1.06 |
| 3 wt % BPO1 | 9.27 | 1.24 |
| JONCRYL ® (1250 ppm) | 10.15 | 1.20 |
| JONCRYL ® (2500 ppm) | 10.11 | 1.22 |
| PMDA (500 ppm) | 9.46 | 1.13 |
| PMDA (1000 ppm) | 9.01 | 1.19 |
| PMDA (500 ppm) + DCN (3 wt %) | 7.62 | 1.09 |
| PMDA (500 ppm) + BPO1 (4 wt %) | 10.04 | 1.39 |

Example 4

Average Percentage Bottle Creep for PET Containers Comprising Creep Control Agents and Gas Barrier Additives Containers were prepared using the above-described polyester both alone and in combination with various creep control agents and gas barrier additives. The average percent bottle creep is displayed in Table 3 and illustrated in FIG. 5. Creep measurements were performed by measuring the volume displacement of water by the bottle at constant temperature.

TABLE 3

Summary of Container Creep Over 8 Weeks

| Polyester Composition | Averaged % Bottle Creep | | | | | | | | |
| --- | --- | --- | --- | --- | --- | --- | --- | --- | --- |
|  | After Fill | 1 Wk. | 2 Wks. | 3 Wks. | 4 Wks. | 5 Wks. | 6 Wks. | 7 Wks. | 8 Wks. |
| Control | 3.78 | 5.58 | 5.35 | 5.23 |  | 5.42 | 5.29 | 5.24 | 5.43 |
| 3 wt % DCN | 3.47 | 5.24 | 5.13 | 5.26 | 5.37 | 5.27 | 5.07 | 5.28 | 5.09 |
| 3 wt % BPO1 | 3.35 | 4.99 | 5.07 | 4.80 | 4.80 | 5.27 | 5.04 | 4.86 | 4.71 |
| JONCRYL ® (1250 ppm) | 3.27 | 4.65 | 4.59 | 4.55 | 4.92 | 4.76 | 4.47 | 4.64 | 4.70 |
| JONCRYL ® (2500 ppm) | 3.18 | 4.69 | 4.31 | 4.39 | 4.07 | 4.24 | 4.25 | 4.29 | 4.31 |
| PMDA (500 ppm) | 2.81 | 4.20 | 4.37 | 4.37 | 4.23 | 4.17 | 4.16 | 4.40 | 4.46 |
| PMDA (1000 ppm) | 3.14 | 4.61 | 4.65 | 4.76 | 4.72 | 4.57 | 4.68 | 4.83 | 4.85 |
| PMDA (500 ppm) + DCN (3 wt %) | 3.44 | 5.85 | 5.68 | 5.64 | 6.05 | 5.43 | 5.56 | 5.45 | 5.48 |
| PMDA (500 ppm) + BPO1 (4 wt %) | 3.67 | 5.56 | 5.82 | 5.53 | 5.48 | 5.51 | 5.94 | 5.60 | 5.99 |

As can be seen from the foregoing, the addition of the creep control agent reduced the creep of the containers as compared to the control containers prepared from the polyester composition with no additives.

Example 5

Aesthetics (Color & Haze) of Pet Containers Comprising Creep Control Agents and Gas Barrier Additives Containers were prepared using the above-described polyester both alone and in combination with various creep control agents and gas barrier additives. The colors of the containers were measured with a Hunter Lab Colorimeter. The results are shown in Table 4. Hunter L*,a*,b* color space is a 3-dimensional rectangular color space based on the opponent-colors theory and expanded in the yellow region, wherein on the L* (lightness) axis white is 100 and black is 0, wherein on the a* (red-green) axis red is positive, green is negative, and neutral is 0; and wherein on the b* (blue-yellow) axis yellow is positive, blue is negative, and neutral is 0. DE* is a measure of the total color difference, calculated by taking the square root of the sum of the squares of the changes in L*,a*,b*. The data in Table 4 represent the average of 9 measurements.

TABLE 4

Analysis of Container Haze

| Variable | L* (D65) | a* (D65) | b* (D65) | Haze (D1003-95)(C) | dE*ab(D65) |
|---|---|---|---|---|---|
| Control | 94.85 | −0.046 | 0.821 | 1.24 | 0.096 |
| 3 wt % DCN | 94.95 | 0.016 | 0.687 | 1.49 | 0.226 |
| 3 wt % BPO1 | 94.86 | −0.032 | 0.688 | 1.23 | 0.169 |
| JONCRYL ® (1250 ppm) | 94.45 | −0.008 | 1.117 | 2.18 | 0.453 |
| JONCRYL ® (2500 ppm) | 93.59 | 0.072 | 1.907 | 3.69 | 1.633 |
| PMDA (500 ppm) | 94.87 | −0.043 | 0.787 | 1.23 | 0.088 |
| PMDA (1000 ppm) | 94.69 | −0.014 | 1.017 | 1.45 | 0.329 |
| PMDA (500 ppm) + DCN (3 wt %) | 94.83 | 0.016 | 0.656 | 1.69 | 0.200 |
| PMDA (500 ppm) + BPO1 (4 wt %) | 94.79 | −0.037 | 0.771 | 1.25 | 0.089 |

As can be seen from the foregoing, the use of the proposed creep control agents generally does not significantly impair the aesthetic appearance of the containers when used in controlled amounts. In particular, it should be noted that the amount of the creep control agent appeared to directly impact the haze of the container as compared to the container made from the polyester without additives.

It should be apparent that the foregoing relates only to the preferred embodiments of the present disclosure and that numerous changes and modification may be made herein without departing from the spirit and scope of the invention as defined by the following claims and equivalents thereof.

Example 6

Containers also were prepared using other polyester resins in combination with gas barrier enhancing additives and/or creep control agents. The other polyester resins included 1103 A (Invista, Spartanburg, S.C.) and MMP 804 (PET Processors LLC, Painesville, Ohio).

A $CO_2$ permeation test was used to determine the shelf life of the containers. The bottles were filled with carbonated water at 4.2 v/v and the loss rate of loss rate of carbon dioxide from the bottles was measured at 22° C. and 50% RH using QuantiPerm. The permeation rates (mL/pkg/day) were used to calculate the percentage loss of carbonation per week and shelf life. The sorption also was estimated by the QuantiPerm software and the percentage of volume expansion was measured for each container.

TABLE 5

Summary of Container Shelf Life

| Polyester Composition | % Expansion | % $CO_2$ loss/week | Sorption % | Shelf life (weeks) | BIF |
|---|---|---|---|---|---|
| 1103 A Resin | 6.26 | 2.54 | 1.59 | 6.31 | — |
| 1103 A Resin + 500 ppm PMDA | 4.86 | 2.24 | 1.63 | 7.79 | 1.13 |
| 1103 A Resin + 500 ppm PMDA + 4% BPO-1 | 7.42 | 2.20 | 1.57 | 6.72 | 1.15 |
| MMP 804 Resin | 4.36 | 2.53 | 1.98 | 6.97 | — |
| MMP 804 Resin + 3% DBI | 5.11 | 1.92 | 1.96 | 8.78 | 1.32 |
| MMP 804 Resin + 3% DBI + 500 ppm PMDA | 4.64 | 1.88 | 1.97 | 9.21 | 1.35 |

As can be seen from the foregoing, the addition of the gas barrier additive and creep control agent significantly increased the shelf life of containers prepared from different types of polyester resins.

Example 7

Preparation of Preforms and Stretch Blow Molded Containers Containing PEM

A polyester composition was prepared by blending a ground 1103 A polyester resin (Invista, Spartanburg, S.C.) with either 3 or 4 wt % of PEM, a gas barrier additive having the chemical formula:

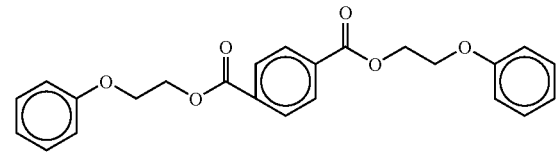

The polyester composition was injection molded using conventional methods to obtain a container preform. The container preforms appeared to be of good quality in terms of clarity and shape without any indication of buildup on the core pin or in the thread splits and other parts of the injection molder, indicating there was no substantial plate-out on the injection molding equipment. The container preforms then were stretch blow molded using conventional methods to obtain bottles which were clear, colorless to the eye, and indistinguishable from one another.

The amount of the additive and intrinsic viscosity (I.V.) of the polyester composition, preform, and container are set forth in the table below.

TABLE 6

Polyester Composition and Preform I.V.

| Polyester Composition | Intrinsic Viscosity (I.V.) (dL/g) |
|---|---|
| 1103 A Resin | 0.83 |
| 1103 A Preform | 0.80 |
| 1103 A Resin + 3% PEM-1 Preform | 0.79 |
| 1103 A Resin + 4% PEM-1 Preform | 0.79 |
| 1103 A Resin + 4% PEM-1 + 750 ppm PMDA | 0.84 |

As the foregoing illustrates, an acceptable I.V. loss of 0.03 dL/g was achieved during the conversion of the resins into preforms. No significant difference in I.V. was observed between the 1103 A control preforms and the preforms molded with 3% and 4% PEM-1. The I.V. of the preforms produced with PMDA at 750 ppm and PEM-1 at 4% was considerably higher than those molded without PMDA.

Those skilled in the art will appreciate that the observed decrease in I.V. with increasing amounts of gas barrier additive is not unusual and that the I.V. could be increased by using a polyester resin having a higher I.V.

Example 8

Containers were prepared using conventional methods using the polyester compositions in Example 7 and evaluated using the methods described hereinabove. The results are summarized in the table below.

TABLE 7

Shelf life and Barrier Improvement Factor (BIF) Results

| Polyester Composition | % Expansion | CO2% loss/ week | Sorption % | Shelf life (wks.) | BIF |
|---|---|---|---|---|---|
| Control | 3.72 | 1.881 | 1.99 | 10.7 | 1.00 |
| 3% PEM-1 | 3.79 | 1.623 | 1.99 | 12.2 | 1.18 |
| 4% PEM-1 | 3.78 | 1.597 | 1.99 | 12.4 | 1.17 |
| 4% PEM-1 & 750 ppm PMDA | 3.92 | 1.523 | 1.99 | 12.9 | 1.25 |

As the foregoing illustrates, the addition of the gas barrier additives to the polyester significantly enhanced the shelf life and gas barrier properties of containers as compared to the containers prepared from polyester without the gas barrier additives. Surprisingly, the addition of just 3 wt % of PEM-1 increased the container BIF by nearly 20% (1.18) and the shelf life by approximately two weeks.

Example 9

Although JONCRYL® ADR-4368-C may be used in the containers described herein, it may cause difficulties during processing. Not wishing to be bound by any particular theory, it is believed that the low melting point of the JONCRYL® material causes it to soften in the feed throat of the injection machines, which leads to agglomeration of the PET material. Therefore, CESA EXTEND™ (Clariant Corporation, Delaware, United States) may be used instead. CESA EXTEND™ was designed to eliminate the agglomeration issue in injection molding by incorporating the JONCRYL® material into a carrier that does not have a low melting point. In this example, containers made with CESA EXTEND™ were tested.

Other containers in this example contained PMDA which had been incorporated into LNO™ c (Phoenix Technologies International LLC, Bowling Green, Ohio) pellets. These materials were devised to test the feasibility of incorporating PMDA into post-consumer recycled material. Combining these materials creates the potential of eliminating the need for separate feeding devices in a production environment. PMDA was blended with ESPS™ ("Extremely Small Particle Size") (Phoenix Technologies International LLC, Bowling Green, Ohio), a recycled and finely ground PET powder, at two loading levels: 2,500 and 10,000 ppm. These blends were then compacted into LNO™ c pellets. The quality of the pellets was tested using a pellet durability test. The higher the result, the higher the durability of the pellet. The scale of the pellet durability index goes to 100. The results were 96.6 and 96 for the 2500 ppm and 10,000 ppm loading levels, respectively. Typical results for LNO™ e pellets are 98 or higher, the lower limit used for quality control is 96.0.

The additives described above were incorporated into preforms made with 1103 A PET resin (Invista). The preforms and the resulting containers were made by the conventional methods described herein. FTIR testing was then performed to determine the shelf life of the containers using the method described in U.S. Pat. No. 5,473,161. The test was performed with a Perkin-Elmer® FT IR Spectrometer with supporting hardware fixtures and software by The Coca-Cola Company. The table below includes the FTIR results. The data compares the containers to a container made with 1103 A with no additives, which is labeled "1103 A Control." Based on the preliminary data, the differences between the predicted shelf lives of the variables are small. The largest improvement was predicted for the container made with 1103 A/10,000 ppm LNO™ c (750 ppm final). The final FTIR predicts longer shelf lives than the earlier data, however, the shelf life improvement factors remain unchanged.

TABLE 8

Preliminary and Final FTIR Results

| Description | Shelf Life Prediction (weeks) | Shelf Life Improvement Factor |
|---|---|---|
| Preliminary FTIR Results | | |
| 1103 A Control | 7.45 (±0.32) | 1.00 |
| 1103 A/10,000 ppm LNO ™ c (500 ppm final) | 6.69 (±0.46) | 0.90 |
| 1103 A/10,000 ppm LNO ™ c (750 ppm final) | 8.31 (±0.33) | 1.12 |
| 1103 A/CESA EXTEND ™ (0.25%) | 7.09 (±0.36) | 0.95 |
| 1103 A/CESA EXTEND ™ (0.375%) | 7.87 (±0.34) | 1.06 |
| Final FTIR Results | | |
| 1103 A Control | 7.78 (±0.57) | 1.00 |
| 1103 A/10,000 ppm LNO ™ c (500 ppm final) | 7.03 (±0.88) | 0.90 |
| 1103 A/10,000 ppm LNO ™ c (750 ppm final) | 8.73 (±0.55) | 1.12 |
| 1103 A/CESA EXTEND ™ (0.25%) | 7.41 (±0.7) | 0.95 |
| 1103 A/CESA EXTEND ™ (0.375%) | 8.17 (±0.52) | 1.06 |

We claim:

1. A container comprising a polyester composition comprising a polyester, a creep control agent, and a gas barrier enhancing additive; wherein the creep control agent comprises a compound having the chemical structure of Formula I:

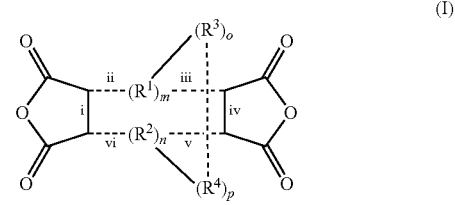

(I)

wherein $R^1$, $R^2$, $R^3$, and $R^4$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, and vi, independent of one another, comprise a single, double, or triple bond; wherein when i is a double bond, ii and vi are single bonds; wherein when ii is a double bond, i and iii are single bonds; wherein when iii is a double bond, ii and iv are single bonds; wherein when iv is a double bond iii and v are single bonds; wherein when v is a double bond, iv and vi are single bonds; wherein when vi is a double bond, i and v are single bonds; wherein vii may be a single bond, double bond, or no bond at all connects $R^3$ and $R^4$;

wherein m, n, o, and p, independent of one another, may be 0 or 1; wherein when m is 0, bonds ii and iii form a single continuous bond; wherein when n is 0, bonds vi and v form a single continuous bond; wherein when o is 0, $R^4$ is bonded to $R^1$ by a single bond; and wherein when p is 0, $R^3$ is bonded to $R^2$ by a single bond;

wherein the creep control agent is present in the polyester composition in an amount from about 200 to about 2000 ppm;

wherein the gas barrier enhancing additive comprises a compound having the chemical structure of Formula A or Formula B:

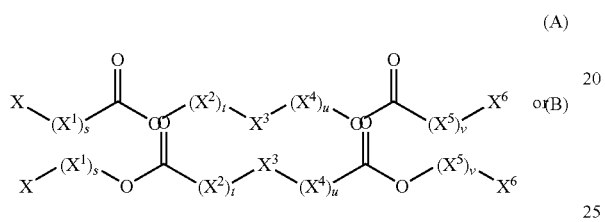

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato or a $C_1$-$C_{10}$ monovalent hydrocarbon which is unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and wherein s, t, u, and v, independent of one another, is a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties; and wherein the container is substantially free of haze and color.

2. A packaged beverage comprising a beverage disposed in the container of claim 1 and a seal for sealing the beverage in the package.

3. The container of claim 1, wherein the creep control agent comprises a compound having the chemical structure of Formula I, wherein m and n are 1; o and p are 0; $R^1$ and $R^2$ are trivalent hydrocarbons comprising 1 carbon atom; i, iii, and v are double bonds; and ii, iv, and vi are single bonds; the creep control agent comprises pyromellitic dianhydride, a compound having the chemical structure:

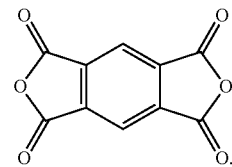

4. The container of claim 1, wherein the gas barrier additive comprises a compound having the chemical structure of Formula I, wherein X and $X^6$ each comprise a phenyl group, s, t, u and v are 0, and $X^3$ comprises a divalent isosorbide, the gas barrier additive comprising a compound having the chemical structure:

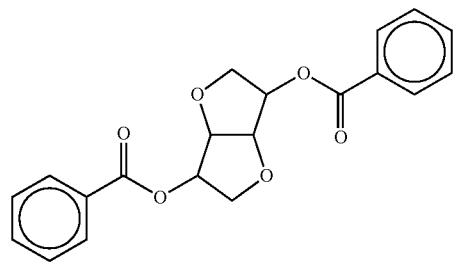

5. The container of claim 1, wherein the gas barrier additive comprises a compound having the chemical structure of Formula I, wherein X and $X^6$ each comprise a phenyl group, s and v are 0, t and u are 1, $X^2$ and $X^4$ each comprise a divalent $C_1$ hydrocarbon, and $X^3$ comprises a divalent cyclohexane, the gas barrier additive comprising a compound having the chemical structure:

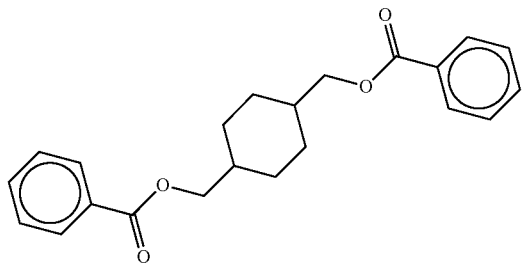

6. The container of claim 1, wherein the gas barrier additive comprises a compound having the chemical structure of Formula I, wherein X and $X^6$ each comprise a naphthyl group, s and v are 0, t and u are 1, $X^2$ and $X^4$ each comprise a divalent $C_1$ hydrocarbon, and $X^3$ comprises a divalent cyclohexane, the gas barrier additive comprising a compound having the chemical structure:

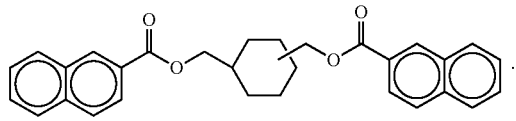

7. The container of claim 1, wherein the gas barrier additive comprises a compound having the chemical structure of Formula II, wherein X and $X^6$ each comprise a cyclohexyl group, s, t, u, and v are 0, and $X^3$ comprises a divalent benzene, the gas barrier additive comprising a compound having the chemical structure:

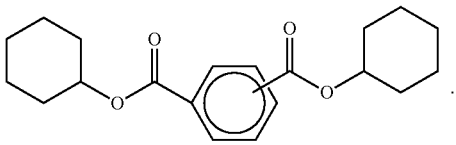

8. The container of claim 1, wherein the gas barrier additive comprises a compound having the chemical structure of Formula II, wherein X and $X^6$ each comprise a cyclohexyl group, s, t, u, and v are 0, and $X^3$ comprises a divalent naphthalene, the gas barrier additive comprises a compound having the chemical structure:

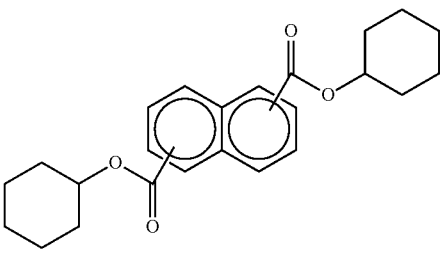

9. The container of claim 1, wherein the gas barrier additive comprises a compound having the chemical structure of Formula II, wherein X and $X^6$ each comprise a benzoate, t and u are 0, s and v are 1, and $X^1$ and $X^5$ each comprise a divalent $C_1$ hydrocarbon, and $X^3$ is a divalent benzene, the gas barrier additive comprising a compound having the chemical structure:

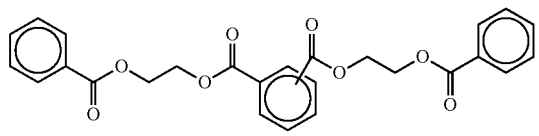

10. The container of claim 1, wherein the gas barrier additive comprises a compound having the chemical structure of Formula II, wherein X and $X^6$ each comprise a benzoate, s and v are 2, $X^1$ and $X^5$ each comprise a divalent $C_1$ hydrocarbon, t and u are 1, $X^2$ and $X^4$ each comprise a divalent benzoate, and $X^3$ comprises a divalent $C_2$ hydrocarbon, the gas barrier additive comprising a compound having the chemical structure:

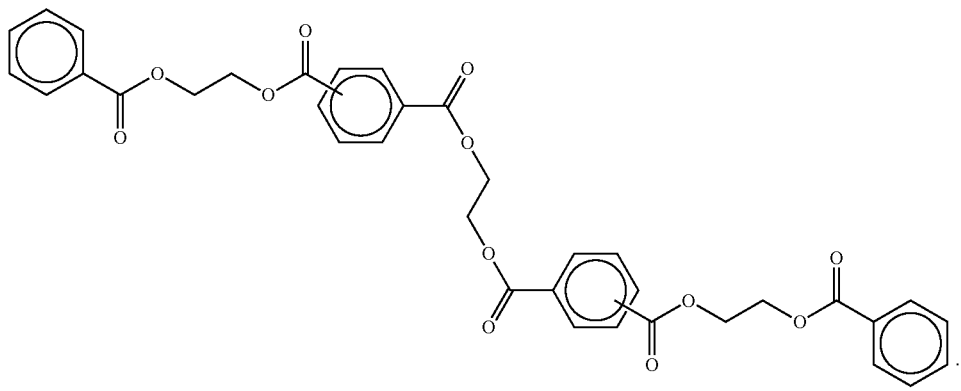

11. The container of claim 1, wherein the gas barrier additive comprises a compound having the chemical structure of Formula II, wherein X and $X^6$ each comprise an phenoxy group.

12. The container of claim 1, wherein $X^3$ comprises a divalent benzene.

13. The polyester composition of claim 1, wherein the polyester comprises polyethylene terephthalate.

14. The polyester composition of claim 13, wherein the polyester comprises a poly(ethylene terephthalate) based copolymer having less than 20 percent diacid, 10 percent glycol modification, or both, based on 100 mole percent diacid component and 100 mole percent diol component.

15. A container comprising a polyester composition comprising a polyester, a creep control agent, and a gas barrier enhancing additive; wherein the creep control agent comprises a compound having the chemical structure of Formula II:

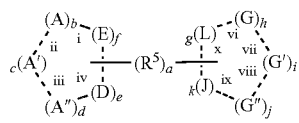

wherein A, A', A", E, D, G, G', G", L, and J, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein i, ii, iii, iv, v, vi, vii, viii, ix, and x, independent of one another, may comprise a single or double bond; wherein when i is a double bond, ii and v are single bonds; wherein when ii is a double bond, i and iii are single bonds; wherein when iii is a double bond, ii and iv are single bonds; wherein when iv is a double bond, iii and v are single bonds; wherein when v is a double bond, i and iv are single bonds; wherein when vi is a double bond, vii and x are single bonds; wherein when vii is a double bond, vi and viii are single bonds; wherein when viii is a double bond, vii and ix are single bonds; wherein when ix is a double bond, viii and x are single bonds;
wherein when x is a double bond, vi and ix are single bonds;
wherein b and g are 1, and c, d, e, f, h, i, j, and k, independent of one another may be 0 or 1;
wherein a may be 0 or 1;
wherein $R^5$ may be a heteroatom or a $C_1$-$C_{10}$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties;
wherein the creep control agent is present in the polyester composition in an amount from about 200 to about 2000 ppm;
wherein the gas barrier enhancing additive comprises a compound having the chemical structure of Formula A or Formula B:

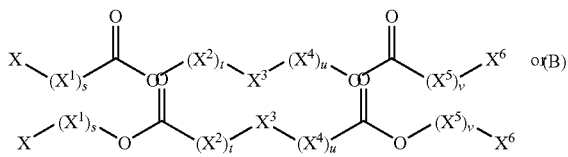

(A)

(B)

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;
wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and
wherein s, t, u, and v, independent of one another, is a number from 0 to 10;
wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties and; and
wherein the container is substantially free of haze and color.

16. A container comprising a polyester composition comprising a polyester, a creep control agent, and a gas barrier enhancing additive; wherein the creep control agent comprises a compound having the chemical structure of Formula III:

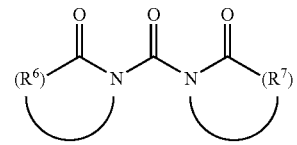

III wherein $R^6$ and $R^7$, independent of one another, may comprise a $C_1$-$C_5$ divalent hydrocarbon that may be unsubstituted or substituted with one or more functional moieties, one or more heteroatoms, or one or more $C_1$-$C_{10}$ hydrocarbyls that may be unsubstituted or substituted with one or more functional moieties;
wherein the creep control agent is present in the polyester composition in an amount from about 200 to about 2000 ppm;
wherein the gas barrier enhancing additive comprises a compound having the chemical structure of Formula A or Formula B:

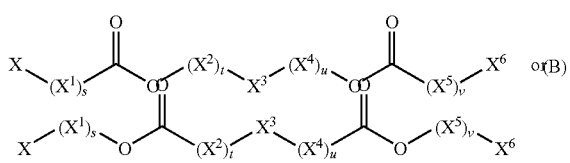

(A)

(B)

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;
wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and
wherein s, t, u, and v, independent of one another, is a number from 0 to 10;
wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties; and
wherein the container is substantially free of haze and color.

17. A container comprising a polyester composition comprising a polyester, a gas barrier enhancing additive, and a creep control agent; wherein the creep control agent comprises a compound having the chemical structure of Formula IV:

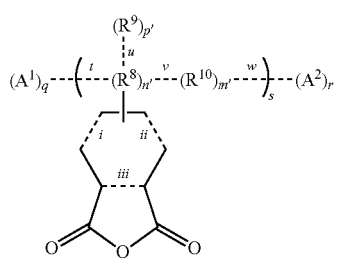

wherein $A^1$, $A^2$, $R^8$, $R^9$, and $R^{10}$, independent of one another, may comprise a heteroatom, a tetravalent carbon atom, a $C_1$-$C_{10}$ divalent or trivalent hydrocarbon, or a $C_1$-$C_{10}$ hydrocarbyl that may be unsubstituted or substituted with one or more functional moieties; wherein each heteroatom, tetravalent carbon atom, or $C_1$-$C_{10}$ divalent or trivalent hydrocarbon may be unsubstituted or substituted with one or more functional moieties or one or more $C_1$-$C_{10}$ hydrocarbyls that may be unsubstituted or substituted with one or more functional moieties;

wherein m', n', and p', independent of one another, may be 0 or 1;

wherein i, ii, and iii, independent of one another may be a single bond or a double bond;

wherein t, u, v, and w, independent of one another may be a single bond, double bond, or triple bond; and wherein q, r, and s may be from 0 to 10,000;

wherein the creep control agent is present in the polyester composition in an amount from about 200 to about 2000 ppm;

wherein the gas barrier enhancing additive comprises a compound having the chemical structure of Formula A or Formula B:

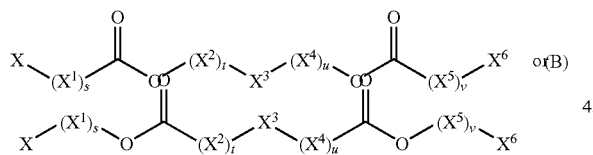

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and wherein s, t, u, and v, independent of one another, is a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties; and wherein the container is substantially free of haze and color.

18. A container comprising a polyester composition comprising a polyester, a creep control agent, and a gas barrier enhancement additive; wherein the creep control agent comprises a compound having the chemical structure of Formula V:

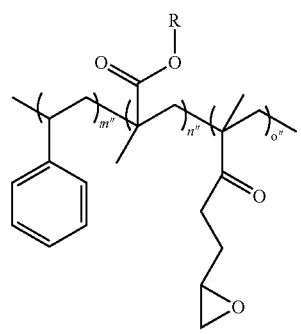

wherein R may comprise a heteroatom or a $C_1$-$C_{10}$ hydrocarbyl which may be unsubstituted or substituted with one or more functional moieties; and wherein m", n", and o", independent of one another, may be from 0 to 1,000, wherein at least one of m", n", and o" is at least 1;

wherein the creep control agent is present in the polyester composition in an amount from about 200 to about 2000 ppm;

wherein the gas barrier enhancing additive comprises a compound having the chemical structure of Formula A or Formula B:

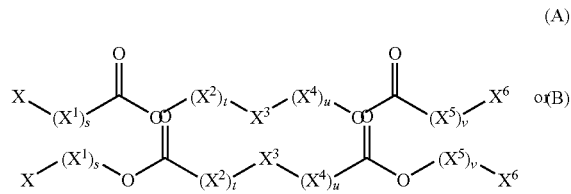

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and wherein s, t, u, and v, independent of one another, is a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties; and wherein the container is substantially free of haze and color.

19. The container of claim 18, wherein the creep control agent comprises a compound having the chemical structure of Formula V, wherein m", n", and o" are 100; and R is a methyl, the creep control agent is a co-polymer having the chemical structure:

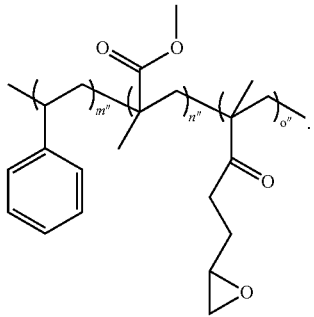

20. A container comprising a polyester composition comprising a polyester, a gas barrier enhancing additive, and a creep control agent; wherein the creep control agent comprises a compound having the chemical structure of Formula VI:

VI

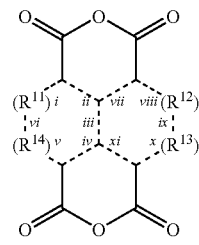

wherein $R^{11}$, $R^{12}$, $R^{13}$, and $R^{14}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, and xi, independent of one another, are a single bond or double bond;

wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, and xi are single bonds;

wherein when v is a double bond, vi and iv are single bonds; wherein when vi is a double bond, i and v are single bonds; wherein when vii is a double bond, ii, iii, and viii are single bonds;

wherein when viii is a double bond, vi and ix are single bonds; wherein when ix is a double bond, viii and x are single bonds; wherein when x is a double bond, ix and xi are single bonds;

wherein when xi is a double bond, iv, x, and iii are single bonds;

wherein the creep control agent is present in the polyester composition in an amount from about 200 to about 2000 ppm;

wherein the gas barrier enhancing additive comprises a compound having the chemical structure of Formula A or Formula B:

(A)

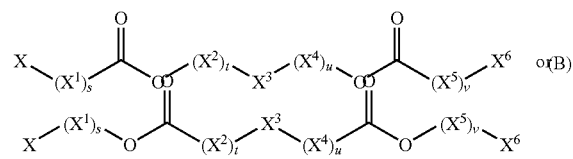

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and wherein s, t, u, and v, independent of one another, is a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_2$-$C_{10}$ monovalent cyclic or heterocyclic non-aryl hydrocarbon that are unsubstituted or substituted with one or more functional moieties; and wherein the container is substantially free of haze and color.

21. A container comprising a polyester composition comprising a polyester, a gas barrier enhancing additive, and a creep control agent; wherein the creep control agent comprises a compound having the chemical structure of Formula VII:

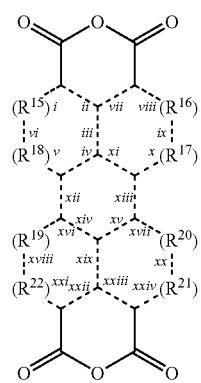

(VII)

wherein $R^{15}$, $R^{16}$, $R^{17}$, $R^{18}$, $R^{19}$, $R^{20}$, $R^{21}$, and $R^{22}$, independent of one another, may comprise a heteroatom, a tetravalent carbon atom, or a $C_1$-$C_3$ divalent or trivalent hydrocarbon; wherein each heteroatom, tetravalent carbon atom, or $C_1$-$C_3$ divalent or trivalent hydrocarbon may be unsubstituted or substituted with one or more functional moieties or one or more $C_1$-$C_{10}$ hydrocarbyls that may be unsubstituted or substituted with one or more functional moieties; and wherein i, ii, iii, iv, v, vi, vii, viii, ix, x, xi, xii, xiii, xiv, xv, xvi, xvii, xviii, xix, xx, xxi, xxii, independent of one another, are a double bond or single bond; wherein when i is a double bond, ii and vi are single bonds; wherein when ii is a double bond, i, iii, and vii are single bonds; wherein when iii is a double bond, ii, iv, vii, and xi are single bonds; wherein when iv is a double bond, iii, v, xi, and xii are single bonds; wherein when v is a double bond, vi, iv, and xii are single bonds; wherein when vi is a double bond, i and v are single bonds; wherein when vii is a double bond, ii, iii and viii are single bonds; wherein when viii is a double bond, vii and ix are single bonds; wherein when ix is a double bond, viii and x are single bonds; wherein when x is a double bond, ix, xi, and xiii are single bonds; wherein when xi is a double bond, iii, iv, xiii and x are single bonds; wherein when xii is a double bond, v, iv, xvi, and xiv are single bonds; wherein when xiv is a double bond, xii, xvi, xv, and xix are single bonds; wherein when xv is a double bond, xiii, xvii, xiv, and xix are single bonds; when xiii is a double bond, xi, x, xv, and xvii are single bonds; when xvi is a double bond, xii, xiv, and xviii are single bonds; wherein when xviii is a double bond, xvi and xxi are single bonds; wherein when xxi is a double bond, xviii and xxii are single bonds; wherein when xxii is a double bond, xxi, xix, and xxiii are single bonds; wherein when xix is a double bond, xiv, xv, xxii, and xxiii are single bonds; wherein when xxiii is a double bond, xix, xxii, and xxiv are single bonds; wherein when xxiv is a double bond, xxiii and xx are single bonds; wherein when xx is a double bond, xvii and xxiv are single bonds; and wherein when xvii is a double bond, xv, xiii and xx are single bonds;

wherein the creep control agent is present in the polyester composition in an amount from about 200 to about 2000 ppm;

wherein the gas barrier enhancing additive comprises a compound having the chemical structure of Formula A or Formula B:

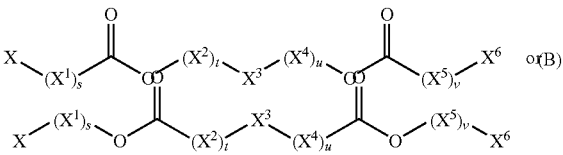

(A)

or (B)

wherein X and $X^6$, independent of one another, comprise hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_1$-$C_{10}$ monovalent hydrocarbon which is unsubstituted or substituted with one or more functional moieties;

wherein $X^1$, $X^2$, $X^3$, $X^4$, and $X^5$, independent of one another, comprise a heteroatom or a $C_1$-$C_{10}$ divalent hydrocarbon, wherein each heteroatom or $C_1$-$C_{10}$ divalent hydrocarbon is unsubstituted or substituted with one or more functional moieties or one or more $C_1$-$C_{10}$ hydrocarbyls that are unsubstituted or substituted with one or more functional moieties; and wherein s, t, u, and v, independent of one another, is a number from 0 to 10;

wherein when $X^3$ comprises a $C_6$ or $C_{10}$ divalent aromatic hydrocarbon, X and $X^6$, independent of one another, comprise a hydrogen, halide, heteroatom, hydroxyl, amino, amido, alkylamino, arylamino, alkoxy, aryloxy, nitro, acyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a $C_3$-$C_{10}$ monovalent cyclic or heterocyclic non-aryl hydrocarbon that are unsubstituted or substituted with one or more functional moieties; and wherein the container is substantially free of haze and color.

* * * * *